United States Patent [19]

Smith

[11] Patent Number: 5,584,027

[45] Date of Patent: Dec. 10, 1996

[54] METHOD AND APPARATUS FOR FINDING INDUCTION VARIABLES FOR USE IN COMPILING COMPUTER INSTRUCTIONS

[75] Inventor: Roger A. Smith, Austin, Tex.

[73] Assignee: Motorola Inc., Schaumburg, Ill.

[21] Appl. No.: 299,131

[22] Filed: Aug. 31, 1994

[51] Int. Cl.$^6$ ............................................. G06F 9/45
[52] U.S. Cl. .................................................. 395/707
[58] Field of Search ............................................ 395/700

[56] References Cited

U.S. PATENT DOCUMENTS 5,109,331  4/1992  Ishida et al. ............................ 395/375

OTHER PUBLICATIONS

Wolfe, M., "Beyond Induction Variables." ACM SIGPLAN 1992 PLDI, p. 162–174.
Wolf et al., "A Loop Transformation Theory and an Algorithm to Maximize Parallellism." IEEE Transactions on Parallel and Distributed Systems, vol. 2, No. 4, Oct. 1991, pp. 452–471.
"Efficiently Computing Static Single Assignment Form and the Control Dependence Graph," Cytron et al; ACM Transactions on Programming Languages and Systems, vol. 13, No. 4; Oct. '91.

"Beyond Induction Variables," Wolfe; ACM SIGPLAN '92 PLDI; pp. 162–174.

*Primary Examiner*—Alvin E. Oberley
*Assistant Examiner*—Peter Joseph Corcoran, III
*Attorney, Agent, or Firm*—Keith E. Witek

[57] ABSTRACT

A compiler and/or a compilation method is used to change or compile a plurality of instructions in memory from a form which is better understood by a human user to a form which is readily executed by a microprocessor. In doing this compilation, execution optimization is usually performed. A more efficient job of optimization (and therefore improved software performance) is achieved by correctly finding/identifying induction variables in code loops which may be used in the compiler's optimization routines. Induction variable properties can be found by constructing and analyzing an integer transfer matrix wherein the values of variables at the beginning of one execution of the loop are related functionally to the values of variables at the end of the one execution of the loop. This matrix can be effectively processed using eigenvalue processing using integer unimodular matrices to determine induction variable properties which were previously missed by prior methods, thereby improving performance.

35 Claims, 7 Drawing Sheets

APPLY LOCAL UNIMODULAR AND LOCAL
INVERSE MATRICES TO MATRIX A, FULL —168
UNIMODULAR AND FULL INVERSE MATRICES
*FIG.6*
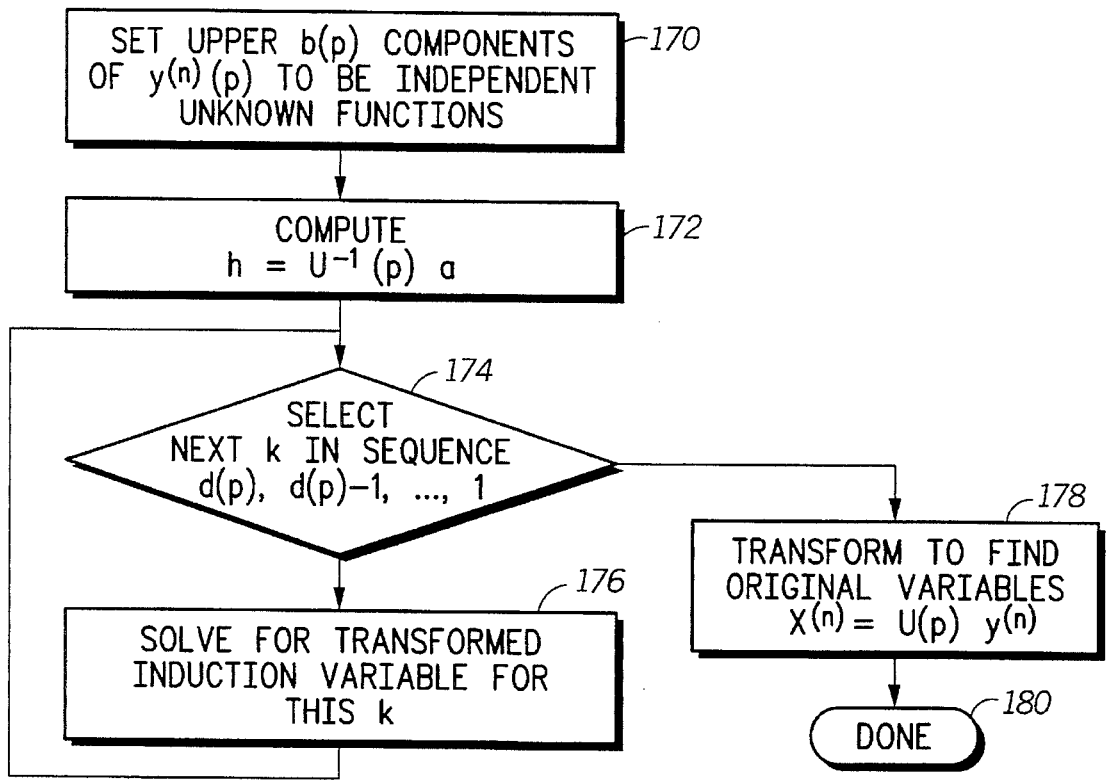
*FIG.7*
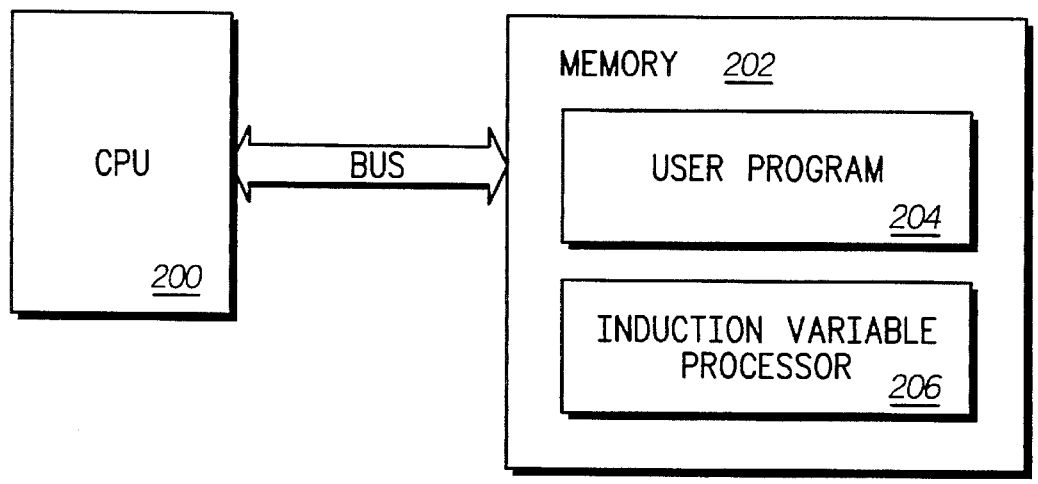
*FIG.8*

METHOD AND APPARATUS FOR FINDING INDUCTION VARIABLES FOR USE IN COMPILING COMPUTER INSTRUCTIONS

FIELD OF THE INVENTION

The present invention relates generally to data processing systems, and more particularly, to finding induction variables in compilers in order to optimize code execution in a data processing system.

BACKGROUND OF THE INVENTION

Previous calculations of induction variables have been limited in the scope or ease of determination of induction variables which they could find, and have been limited to finding induction variables when they occur as user variables.

A recent paper "Beyond Induction Variables" by Michael Wolfe, ACM Sigplan 92, p. 162 describes a prior state-of-the-art method for computing induction variables. His analysis uses the static-single-assignment form.

The work of Wolfe has several limitations: it is limited to a sequence of assignments of the form Scalar=Scalar+constant, as stated on p. 165 of Wolfe's teachings. The disadvantages of this form is that it is not very general and misses a large amount of induction variables when an assignment is not of the form Scalar=Scalar+constant. For Wolfe, the right-hand side may have only one term, and its coefficient is unity. A need exists to allow much more general linear combinations which allow multiple terms on the right-hand side with different integer constants/coefficients.

While Wolfe's work does make it possible to find quadratic induction variables, his method works only in the presence of the restriction noted above and requires the solution of matrix equations. Similarly, Wolfe's analysis is able to determine some geometric induction variables, but only by setting up and solving equations to find coefficients of powers of induction variables.

Further, Wolfe's method is able to look for flip-flop induction variables, but again with the restrictions noted above. In addition, this is a special case to be looked for.

Wolfe's methods also use methods which require generation of inverse matrices of integer matrices. Since his matrices are not unimodular matrices, his methods introduce fractions when the inverse matrix is computed. Fractions should be avoided as much as is possible and is a disadvantage of Wolfe's method.

Finally, Wolfe's methods don't find induction variables when the user's original variables are not induction variables. This is a severe limitation to Wolfe's method.

The paper "Efficiently Computing Static Single Assignment Form and the Control Dependence Graph" by Ron Cytron, Jeanne Ferrante, Barry K. Rosen and Mark N. Wegman, ACM Transactions on Programming Languages and Systems, 13 (1991) p. 451, is a help in understanding the work described by Wolfe.

BRIEF DESCRIPTION OF THE DRAWINGS

FIGS. 1–7 illustrates, in a flowchart, a method for compiling a computer program by finding induction variables, the method being in accordance with the present invention; and FIG. 8 illustrates, in a block diagram, a data processing system for finding induction variables in order to optimize execution of computer code, the data processing system being in accordance with the present invention.

Figure 1:
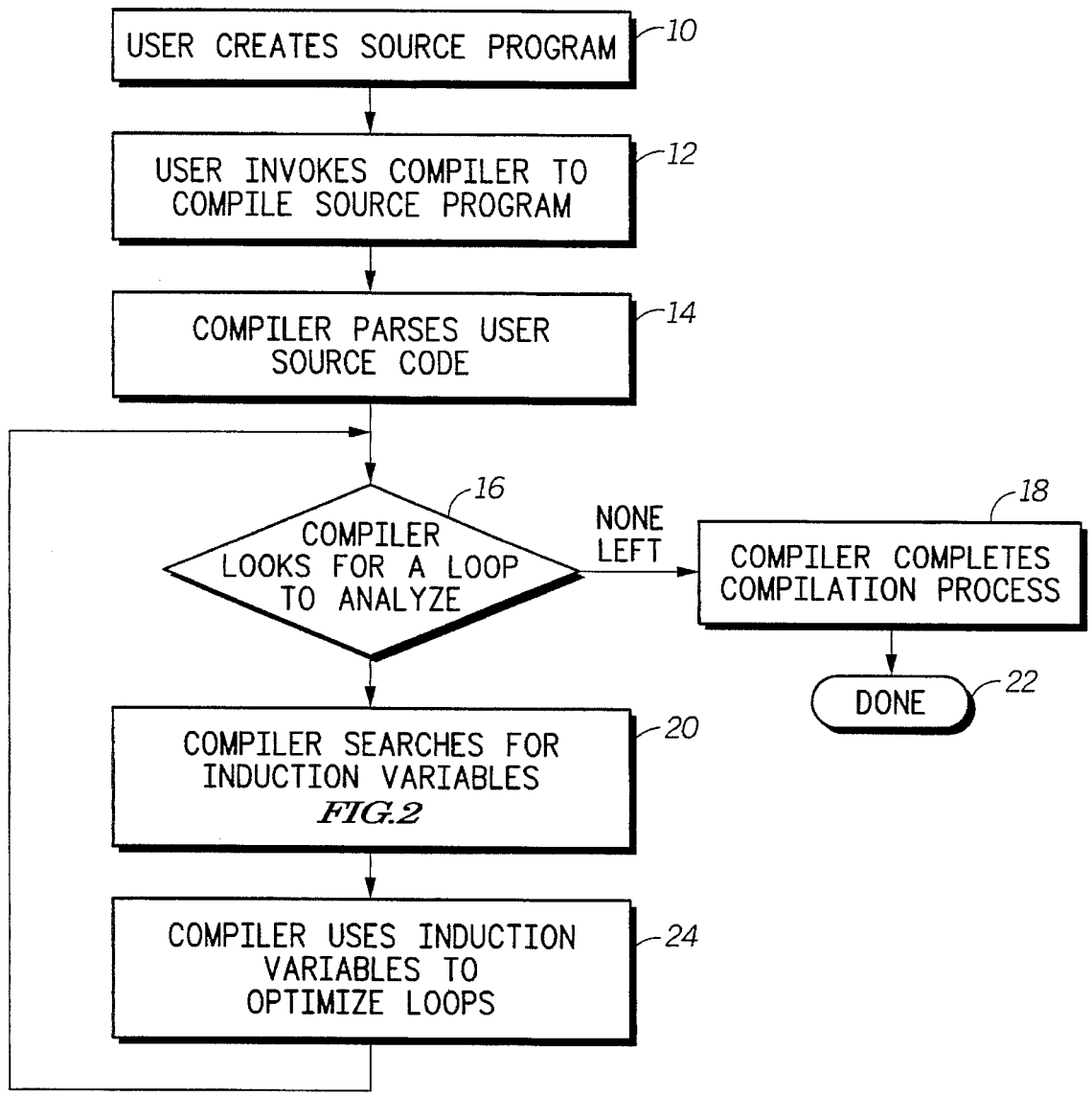

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

GENERAL OVERVIEW OF A PREFERRED EMBODIMENT

Generally, the present invention provides a method and apparatus for determining induction variable properties from a user program or a plurality of computer instructions. In particular, user programs or pluralities of instructions typically contain one or more program loops wherein one or more instructions are executed multiple times in a looping fashion contingent upon a either a loop starting condition or a loop ending condition. These loops comprise a large portion of the executable code in terms of time spent executing. Therefore, the effective optimization of loop structures in programs can greatly improve overall execution performance with potentially minimal changes. By identifying induction variables, optimization of caches, transformation of program structure, execution time, and the like become possible in addition to code optimization. In prior methods, the ability to find induction variable properties of certain variables was often impossible or elusive. Given the methods and data processing systems described herein, the determination of induction variables is much more complete and therefore more useful when optimizing code or performing similar performance enhancing operations on software.

In general, the induction variable identifier discussed herein operates as follows. For a selected loop, a sequence of instructions is to be executed multiple times until a completion criterion is satisfied. A loop counter is initialized to a starting value of zero before the sequence of instructions is executed and is incremented by a value one each time the sequence of instructions is executed again. The loop counter is defined even if a particular user program does not have a variable which is the loop counter. Within the sequence of instructions, an induction variable is a variable whose value is a simple function of the incrementing or decrementing value n of the loop counter. A purpose of the induction variable identifier is to find as complete as possible a set of induction variables within the loop.

The induction variable identifier taught herein utilizes an improved framework based on a transfer matrix which relates mathematically a final set of values of a set of variables after the sequence of instructions has been executed while the loop counter has the value i to an initial set of values of the set of variables before the sequence of instructions has been executed with the loop counter set to the value i. In other words, the transfer matrix relates values at an (i+1)th iteration of the loop to an ith iteration of the loop or vice versa using a common variable. The transfer matrix is analyzed multiple times to find multiple sets of eigenvectors corresponding to a predetermined selected set of integer eigenvalues. An analysis, which develops and uses a sequence of integer unimodular transformations, assures that all of the arithmetic can be performed without an introduction of a rounding error as is inevitable in the prior art methods.

The analysis determines a set of transformed induction variables corresponding to the predetermined set of integer eigenvalues and provides an expression of variables appearing in the sequence of instructions (i.e., the loop) as a linear combination of the set of transformed induction variables.

Novel aspects of the induction variable identifier include using the transfer matrix and the integer unimodular transformations to determine the set of transformed induction variables. Desirable features of the induction variable identifier include: (1) an ability to find transformed induction variables even when no original variable in the sequence of instructions is an induction variable; (2) an ability to determine a set of induction variables for a wider class of simple functions of n than simply linear induction variables; (3) an ability to quickly determine all non-accidental induction variables related to a specific eigenvalue; (4) a faster means of identifying induction variables of anything other than the simplest kind; and/or (5) an ability to find induction variables without imposing as many restrictions on the structure of the statements in the sequence of statements as other methods. The ability to find induction variables in a wider variety of circumstances offers greater possibilities in optimizing and transforming the sequence of instructions to improve performance. An additional advantages comes from having a unified treatment of a wide class of induction variables. The unified treatment reduces the complexity of developing and maintaining an entire system which utilizes the induction variable identifier. In other words, the induction variable identifier is easier to use than prior methods due to a uniform approach to finding many different types of induction variables.

THE GENERAL SCIENTIFIC THEORY BEHIND THE OPERATION OF A PREFERRED EMBODIMENT

1. Matrix and vector terminology and definition

An N-component vector v is a collection of components $v_i$, where i can be any of the values $1, 2, \ldots, N$. N being any integer from 1 to $\infty$. An integer N-component vector is an N-component vector whose elements are integers.

An M×N matrix A is a collection of elements $A_{ij}$, where i can be any of the values $1, 2, \ldots, N$ and j independently can be any of the values $1, 2, \ldots, N$. An integer M×N matrix is an M×N matrix whose elements are integer values.

A product of an M×N matrix A with an N-component vector v is an M-component vector Av whose elements are $$(Av)_i = \sum_{j=1}^{n} A_{ij} v_j. \tag{1}$$

A product of an M-component vector v with an M×N matrix A is an N-component vector vA whose elements are $$(vA)_i = \sum_{j=1}^{M} v_j A_{ji}. \tag{2}$$

A product of an L×M matrix A with an M×N matrix B is an L×N matrix AB whose elements are $$(AB)_{ij} = \sum_{k=1}^{M} A_{ik} B_{kj}. \tag{3}$$

An N×N matrix A has a determinant |A| given by $$|A| = \sum_{i_1, i_2, \ldots, i_N = 1}^{N} \epsilon_{i_1 i_2 \ldots i_N} A_{1 i_1} A_{2 i_2} \ldots A_{N i_N} \tag{4}$$

where $\epsilon_{12 \ldots N} = 1$ and $\epsilon_{i_1 i_2 \ldots i_N}$ is antisymmetric under the interchange of any two indices.

The determinant of the product of two N×N matrices A and is equal to the product of the determinants of A and B:

$$|AB| = |A||B|. \tag{5}$$

A unimodular N×N matrix A is an N×N matrix A whose determinant |A| is +1 or −1. An integer unimodular N×N matrix A is a unimodular matrix A whose elements are all integer values.

An N×N identity matrix I is an N×N matrix with elements $I_{ij}$ equal to 1 if i=j and equal to 0 otherwise. For any N×N matrix A, AI=IA=A.

An N×N matrix A whose determinant is not zero has an inverse matrix $A^{-1}$ which satisfies $$AA^{-1} = A^{-1}A = I. \tag{6}$$

where I is the identity matrix.

An inverse of a unimodular N×N matrix is also a unimodular N×N matrix. An inverse of an integer unimodular N×N matrix is also an integer unimodular N×N matrix.

A number $\lambda$ is an eigenvalue of an N×N matrix A if $$|\lambda I - A| = 0. \tag{7}$$

Since the determinant in eq. (7) is a polynomial of order N in $\lambda$, there are at most N distinct eigenvalues for an N×N matrix. If the matrix A has real elements, its eigenvalues can be real or complex, and the complex eigenvalues must occur in pairs.

An N-component vector v is a left eigenvector of an N×N matrix A with eigenvalue $\lambda$ if $$vA = \lambda v. \tag{8}$$

An N-component vector v is a right eigenvector of an N×N matrix A with eigenvalue $\lambda$ if $$Av = \lambda v. \tag{9}$$

A symmetric N×N matrix A is a matrix A whose elements satisfy the relationship $A_{ij} = A_{ji}$. If a symmetric N×N matrix A has real elements, it has N linearly independent left eigenvectors which are also right eigenvectors. If an N×N matrix A is not symmetric, it may have fewer than N distinct left eigenvectors and its left eigenvectors are not necessarily right eigenvectors.

A diagonal N×N matrix A is an N×N matrix A whose elements are 0 whenever $i \neq j$.

A diagonal N×N matrix D, an N×N transformation matrix T, and an N×N inverse transformation matrix $T^{-1}$ exist for any symmetric N×N matrix A; these matrices satisfy a transformation property $$D = T^{-1} A T \tag{10}$$

The N elements $D_{ii}$ of the diagonal matrix D are the eigenvalues of the matrix A.

For an N×N matrix A which is not symmetric, it is not always possible to find a transformation matrix T to form a product $T^{-1}AT$ which is a diagonal matrix.

2. A simple attempt to use matrices to find induction variables.

A sequence of instructions in a loop is to be analyzed in order to find a set of induction variables. A set of potential integer induction variables is identified by analyzing the sequence of instructions. A reduced set of N potential integer induction variables is a set of potential integer induction variables for which the value of any of the variables in the set after executing the sequence of instructions can be expressed as an integer constant plus a linear combination with integer coefficients of the values of variables in the set prior to executing the sequence of instructions. A loop counter has an integer value n which is 0 before the sequence of instructions has been executed and is incremented by 1 each time the sequence of instructions has been executed. A variable vector $x^{(n)}$ is associated with the reduced set of potential induction variables by numbering the potential induction variables from 1 to N sequence of instructions; the element $x_i^{(n)}$ of the variable vector is the value of the $i^{th}$ reduced potential induction variable just before the sequence of instructions is executed for a loop counter value of n.

An integer N×N transfer matrix A and an integer N-component increment vector a express the value of each variable after the sequence of instructions is executed for a loop counter value of n in terms of the values before for the sequence is executed for a loop counter value of n as $$x^{(n+1)} = Ax^{(n)} + a. \tag{11}$$

Eq. (11) represents a one-step recursion relation which can be solved for the variable vector $x^{(n)}$ as a function of n as $$x^{(n)} = A^n x^{(0)} + (A^{n-1} + A^{n-2} + \ldots + A + 1)a. \tag{12}$$

Eq. (12) represents each variable in $x^{(n)}$ as a function of n. Each element of $x^{(n)}$ which is a simple function of n is an induction variable. A user of the induction variable identifier must decide which functions n are simple. While eq. (12) completely describes the functions associated with each variable, the representation as a sum of n terms makes it is hard to find a general rule to determine what the function value will be for any n.

A naive transfer matrix analyzer makes several simplifying assumptions to determine explicitly the functions of n given implicitly in eq. (12). The naive transfer matrix analyzer assumes that there exists an N×N matrix T with an N×N inverse matrix $T^{-1}$ which transforms the N×N integer transfer matrix A to an N×N diagonal matrix D given by $$D = T^{-1}AT \tag{13}$$

The product of the matrix $T^{-1}$ with the variable vector $x^{(n)}$ gives a transformed variable vector $y^{(n)}$ defined by $$y^{(n)} = T^{-1} x^{(n)} \tag{14}$$

which can be computed as $$y^{(n)} = D^n y^{(0)} + (D^{n-1} + D^{n-2} + \ldots + D + 1)(T^{-1}a). \tag{15}$$

Eq. (15) is simpler than eq. (12) because the N×N matrix D is diagonal. This diagonal matrix makes it possible to compute the value of each transformed variable in $y^{(n)}$ directly as $$y_i^{(n)} = D_{ii}^n y_i^{(0)} + \frac{D_{ii}^n - 1}{D_{ii} - 1} (T^{-1}a)_i. \tag{16}$$

The naive transfer matrix analyzer assumes in eq. (16) that the element $D_{ii} \neq 1$ since the equation (16) is solvable only for $D_{ii} \neq 1$.

Once the transformed variable vector $y^{(n)}$ has been computed, the variable vector $x^{(n)}$ can then be calculated from $$x^{(n)} = Ty^{(n)}. \tag{17}$$

Eq. (16) expresses clearly the functional dependence of $y_i^{(n)}$ on n and the quantities $D_{ii}$, $y_i^{(0)}$ and $(T^{-1}a)_i$. Eq. (17) shows that $x^{(n)}$, as a linear combination of relatively simple functions of n, is also a relatively simple function of n.

There are several important reasons that the naive transfer matrix analyzer's determination of $x^{(n)}$ using eq. (16) and eq. (17) is not practical: (i) in general, the N×N transfer matrix A is not symmetric and cannot be diagonalized using eq. (13); (ii) often the eigenvalue of greatest interest is 1 which violates the assumption in eq. (16); (iii) the eigenvalues of the transfer matrix A and the elements of the transformation matrix T and the inverse transformation matrix $T^{-1}$ are not necessarily integer values—they may be rational, irrational, or complex values. Rational eigenvalues would complicate the computation, while irrational or complex values generally would make it impossible to carry out a precise numerical calculation of even the integer eigenvalues. This is usually unacceptable.

3. An overview of the transfer matrix analyzer

A transfer matrix analyzer is an important part of the induction variable identifier taught herein. An overview of the transfer matrix analyzer is given in this section, at a level which indicates how the pitfalls of the naive transfer matrix analyzer (described above) are avoided.

A designer wanting to identify induction variables chooses a set of integer eigenvalues. The set of integer eigenvalues determines a set of known functions of n, as described in section 7 herein, such that a variable will be recognized as an induction variable when the induction variable identifier finds that the variable can be expressed as a linear combination of functions in the set of known functions of n. In very broad form, the transfer matrix analyzer uses a process for generating transformations appropriate to the set of integer eigenvalues; the process, which is discussed in more detail in section 4, generates a sequence of transformations acting on the matrix A to obtain a transformed transfer matrix. As described in section 7, a transformed variable vector is determined, wherein the values of the transformed variables are expressed as a linear combination of functions in the set of known functions of n and a set of independent unknown functions. A transformation matrix generated by the process for generating transformations is used to express the values of the original variables also as a linear combination of functions in the set of known functions of n and the set of independent unknown functions.

The induction variable identifier takes the N×N transfer matrix A and applies a sequence of transformations to it; a integer transformation counter p counts the number of transformations have been applied, and a partially transformed N×N transfer matrix A(p) is expressed in terms of a unimodular integer N×N transformation matrix U(p) and an N×N unimodular integer inverse transformation matrix $U^{-1}(p)$ as $$A(p)=U^{-1}(p)AU(p). \tag{18}$$

The N×N unimodular integer matrix U(p) is chosen so that the A(p) has a form $$A(p) = \begin{pmatrix} B(p) & C(p) \\ 0 & D(p) \end{pmatrix} \tag{19}$$

in terms of an unresolved b(p)×b(p) integer matrix B(p), an interesting d(p)×d(p) integer matrix D(p), and a b(p)×d(p) integer matrix C(p). The integers b(p) and d(p) sum to N. The matrix D(p) has elements $D_{ij}=0$ for i>j and represents the part of the transfer matrix A(p) which can be used to find d(p) transformed variables as a linear combination of functions in the set of known functions of n. At the start of the process, the transformation counter p has the value 0, the N×N unimodular integer matrix U(0) and the inverse N×N unimodular integer matrix $U^{-1}$(0) are the N×N identity matrix I and the initial partially transformed transfer matrix is A(0) =A. The sequence of transformations is dynamically chosen so that d(p) increases after each transformation, which means that more of the transformed transfer matrix A(p) is included in the interesting matrix D(p). The transformations and a criterion for deciding when to end the sequence of transformations are described in more detail in sections 4–6.

After all transformations in the sequence of transformations have been found, the transfer matrix analyzer determines the components of a transformed variable vector $y^{(n)}(p)$ defined by $$y^{(n)}(p)=U^{-1}(p)x^{(n)}. \tag{b 20}$$

The transformed variable vector $y^{(n)}(p)$ satisfies a recursion relation $$y^{(n-1)}(p)=A(p)y^{(n)}(p)+U^{-1}(p)a \tag{21}$$

A transformed variable solver described in section 7 determines each of the first b(p) components of $y^{(n)}(p)$ as an independent but unknown function of n and each of the remaining d(p) components of $y^{(n)}(p)$ as a linear combination of functions in the set of known functions of n by analyzing the d(p)×d(p) matrix D(p).

After all of the components of $y^{(n)}(p)$ have been determined as functions of n, the variables represented by the variable vector $x^{(n)}$ are readily obtained from the relation $$x^{(n)}=U(p)y^{(n)}(p). \tag{22}$$

Since U(p) is an N×N integer unimodular matrix, $x^{(n)}$ is expressed exactly as a linear combination of specific known or independent unknown functions of n.

4. A transformation process for generating transformations to increase d(p).

A transformation process is an iterative process to generate a sequence of unimodular integer N×N transformation matrices U(p) and unimodular integer N×N inverse transformation matrices $U^{-1}(p)$ using the predetermined set of integer eigenvalues chosen by the designer.

A first step in the iteration process is the selection of an eigenvalue λ from the set of integer eigenvalues. An eigenvector analysis is made of the b(p)×b(p) integer matrix B(p) to find a set of all left eigenvectors of B(p) corresponding to the eigenvalue λ. If there are no left eigenvectors, the process is repeated for the next eigenvalue from the predetermined set of integer eigenvalues or terminates if all eigenvalues in the set have been used. Otherwise, the set contains an integer number e(p) of left eigenvectors of B(p).

The eigenvector analysis also produces a b(p)×b(p) unimodular integer matrix V(p) and its b(p)×b(p) inverse, a unimodular integer matrix $V^{-1}(p)$. The integer matrix $V^{-1}(p)$ has the properties that its last e(p) rows are left eigenvectors of B(p) with eigenvalue λ. A method for carrying out the eigenvector analysis which derives the matrices $V^{-1}(p)$ and $V^{-1}(p)$ is described in section 5.

The matrices V(p) and $V^{-1}(p)$ are used to generate the matrices A(p+1), U(p+1), and $U^{-1}(p+1)$ using the relationships $$A(p+1) = \begin{pmatrix} V^{-1}(p) & 0 \\ 0 & I \end{pmatrix} A(p) \begin{pmatrix} V(p) & 0 \\ 0 & I \end{pmatrix} \tag{23}$$

$$U(p+1) = U(p) \begin{pmatrix} V(p) & 0 \\ 0 & I \end{pmatrix} \tag{24}$$

$$U^{-1}(p+1) = \begin{pmatrix} V^{-1}(p) & 0 \\ 0 & I \end{pmatrix} U^{-1}(p). \tag{25}$$

If the matrices U(p) and $U^{-1}$ (p) have forms $$U(p) = \begin{pmatrix} U_{11} & U_{12} \\ U_{21} & U_{22} \end{pmatrix} \tag{26}$$

$$U^{-1}(p) = \begin{pmatrix} (U^{-1})_{11} & (U^{-1})_{12} \\ (U^{-1})_{21} & (U^{-1})_{22} \end{pmatrix}$$

the computations of eqs. (23)–(25) can be carried out by $$A(p+1) = \begin{pmatrix} \lambda + V^{-1}(p)(B(p)-\lambda)V(p) & V^{-1}(p)C(p) \\ 0 & D(p) \end{pmatrix} \tag{27}$$

$$U(p+1) = \begin{pmatrix} U_{11}V(p) & U_{12} \\ U_{21}V(p) & U_{22} \end{pmatrix} \tag{28}$$

$$U^{-1}(p+1) = \begin{pmatrix} V^{-1}(p)(U^{-1})_{11} & V^{-1}(p)(U^{-1})_{12} \\ (U^{-1})_{21} & (U^{-1})_{22} \end{pmatrix}. \tag{29}$$

Eqs. (27)–(29) provide an economical way of calculating these matrices after the eigenvector analysis described in section 5 has been carried out. The matrix A(p+1) may then be repartitioned into the form of eq. (19) with b(p+1)=b(p)−e(p) and d(p+1)=d(p)+e(p), and the transformation counter p is incremented by 1. The iterative process repeats with the selection of another eigenvalue from the predetermined set of interesting eigenvalues.

Since B(p) is generally not symmetric, the process must be repeated for the same λ until no more left eigenvectors are found corresponding to that eigenvalue. The need to repeat is not a weakness of the process; indeed this repetition is precisely what is needed to overcome the difficulty of not having a symmetric transfer matrix that was apparent in the naive transfer matrix analysis. Section 7 shows how the need to repeat the iterative process for the same λ shows up in determining the functions of n.

5. An eigenvector analysis of B(p) for eigenvalue λ

An eigenvector analysis finds all left eigenvectors z of the matrix B(p) corresponding to the eigenvalue λ and the matrices V(p) and $V^{-1}(p)$ discussed in section 4. The eigenvectors z satisfy the equation $$z(B(p)-\lambda I)=0. \tag{30}$$

The eigenvector analysis can be carried out by finding the number of linearly independent vectors w satisfying $$wV^{-1}(p)(B(p)-\lambda I)=0 \tag{31}$$

for any matrix $V^{-1}(p)$ which has an inverse. For each w satisfying eq. (31), the z satisfying eq. (30) is given by $$z=wV^{-1}(p). \tag{32}$$

A suitable choice for $V^{-1}(p)$ is an integer unimodular matrix product of a sequence of integer unimodular m×m column reduction matrices $R^{-1}(p,j)$ $$V^{-1}(p)=R^{-1}(p,m)R^{-1}(p,m-1)\ldots R^{-1}(p,1) \tag{33}$$

where m=b(p). The corresponding V(p) is given by $$V_{(p)}=R(p,1)R(p,2)\ldots R(p,m) \tag{34}$$

The column reduction matrices are applied successively to columns 1, 2, ..., m, with the initial reduction performed on the matrix $(B(p)-\lambda I)$. The column reduction on column j has the object of annihilating (setting to zero) as many of the bottom elements of the column j as possible without reversing annihilations achieved in previous columns.

As column reduction on column j is completed, the matrix $R^{-1}(p,j)$ either succeeds or fails in forcing a new component of w to vanish in eq. (31). For example, if after column 1 is reduced the top element of column 1 of the matrix $R^{-1}(p,1)(B(p)-\lambda I)$ is non-zero, the first component of w must vanish. If the first element is not zero, the first column places no constraint on the top component of w. A quantity $f(j)$ keeps track of the number of elements of w which have been forced to vanish prior to the reduction of column j. Initially, $f(1)=0$. After the reduction of column j, the element in row $f(j)+1$ of column j is to be examined. If it is non-zero, another component of w is forced to vanish and $f(j+1)=f(j)+1$. If it is zero, $f(j+1)=f(j)$.

After all reductions are carried out, $f(m+1)$ is the number of components of w which must vanish, and the number of left eigenvectors of $(B(p)-\lambda I)$ is given by $$e(p)=m-f(m+1). \tag{35}$$

A natural set of linearly independent vectors w is the set of e(p) vectors in which each vector has a different one of the last e(p) components 1 and the remaining components 0. From eq. (32), the corresponding left eigenvectors of B(p) are the last e(p) rows of the matrix $V^{-1}(p)$.

The successive reductions of the matrix $(B(p)-\lambda I)$ generate the matrix $V^{-1}(p)(B(p)-\lambda I)$ which appeared in eq. (27).

6. A unimodular reduction on column j of an m×m integer matrix

The column reduction for column j is to be carried out by the m×m unimodular integer matrix $R^{-1}(p,j)$. The matrix $R^{-1}(p,j)$ is written as a product of simple unimodular integer matrices $S^{-1}(p,j,k)$ which annihilate the element in row k and column j of a matrix to which they are applied. Since $R^{-1}(p,j)$ is to annihilate the elements in rows m, m-1, ..., $f(j)+2$, it has the form $$R^{-1}(p,j)=S^{-1}(p,j,f(j)+2)S^{-1}(p,j,f(j)+1)\ldots S^{-1}(p,j,m). \tag{36}$$

Each simple matrix $S^{-1}(p,j,k)$ depends upon the integer matrix elements in rows k-1 and k of column j of the matrix which it is reducing. If the matrix being reduced has a form $$\begin{pmatrix} \alpha \\ \beta \end{pmatrix} \begin{matrix} k-1 \\ k \end{matrix} \tag{37}$$

in which $\alpha$ and $\beta$ are integers and the matrix elements not shown are not needed to determine $S^{-1}(p,j,k)$. The simple unimodular integer matrix $S^{-1}(p,j,k)$ which annihilates the element $\beta$ has the form $$S^{-1}(p,j,k)=\begin{pmatrix} I & 0 & 0 & 0 \\ 0 & r & r' & 0 \\ 0 & q & q' & 0 \\ 0 & 0 & 0 & I \end{pmatrix} \begin{matrix} k-1 \\ k \end{matrix} \tag{38}$$

where the upper I is a (k-2)×(k-2) identity matrix and the lower I is an (m-k)×(m-k) identity matrix. The integer elements r, r', q, q' constrained to make $S^{-1}(p,j,k)$ an integer unimodular m×m matrix and to annihilate the element $\beta$. $S^{-1}(p,j,k)$ will be an integer unimodular m×m matrix if $$rq'-r'q=\pm 1 \tag{39}$$

and $\beta$ will be annihilated if $$q\alpha-q'\beta=0. \tag{40}$$

The theory of continued fractions provides a simple method of computing the integers r, r', q, q' which satisfy eqs. (39) and (40). Given a pair of integers $n_0$ and $d_0$, a numerator sequence $\{N_{-1}=0, N_0=1, N_1, \ldots, N_u\}$ and a denominator sequence $\{D_{-1}=1, D_0=0, D_1, \ldots, D_u\}$ are generated by setting u=0, $n=n_0$, $d=d_0$ and repeating the calculations:

$$u=u+1$$

$$N_i=\lfloor n/d \rfloor N_{i-1}+N_{i-2}$$

$$D_i=\lfloor n/d \rfloor D_{i-1}+D_{i-2}$$

$$t=n-\lfloor n/d \rfloor d$$

$$n=d$$

$$d=t \tag{41}$$

until d=0. Two results from the theory of continued fractions are $$N_u d_0=D_u n_0 \tag{42}$$

$$D_u N_{u-1}-N_u D_{u-1}=(-1)^u. \tag{43}$$

Let $\alpha=s|\alpha|$, where $s=\pm 1$ and $\beta=t|\beta|$ where $t=\pm 1$. After choosing $n_0=|\alpha|$, $d_0=|\beta|$ and computing the numerator sequence and the denominator sequence described above, the choices $$r=stD_{u-1}$$

$$r'=-N_{u-1}$$

$$q=(-1)^u D_u$$

$$q'=-(-1)^u stN_u \tag{44}$$

will satisfy eqs. (39) and (40). Since $S^{-1}(p,j,k)$ is by construction an integer unimodular matrix, its inverse $S(p,j,k)$ is also an integer unimodular matrix given by $$S(p,j,k) = \begin{pmatrix} I & 0 & 0 & 0 \\ 0 & q' & -r' & 0 \\ 0 & -q & r & 0 \\ 0 & 0 & 0 & I \end{pmatrix} \begin{matrix} k-1 \\ k-1 \\ k \\ {} \end{matrix} \quad (45)$$

$$\begin{matrix} k-1 & k \end{matrix}$$

Finally, an inverse of $R^{-1}(p,j)$ is given by $$R(p,j)=S(p,j,m)S(p,j,m-1)\ldots S(p,j,f(j)+2) \quad (46)$$

7. Expressing transformed induction variables as functions of n

When no transformations remain to be applied, it is time to analyze the last integer matrix $A(p)$ having the form shown in eq. (19) to find transformed induction variables as functions of n. The matrix $D(p)$ is not necessarily diagonal, but all elements below the diagonal are 0 and its diagonal elements are eigenvalues for which left eigenvectors were found. The transformed recursion relation is given by eq. (21). The upper $b(p)$ components and the lower $d(p)$ components of $y^{(n)}(p)$ are generated differently. Let $u^{(n)}$ be a $d(p)$-component vector consisting of the lower $d(p)$ components of $y^{(n)}(p)$ and h be a $d(p)$-component vector whose components are the lower $d(p)$ components of the vector $U^{-1}(p)a$.

The $u^{(n)}$ satisfies the recursion relation $$\begin{pmatrix} u_1^{(n+1)} \\ u_2^{(n+1)} \\ \cdot \\ \cdot \\ u_{d(p)-1}^{(n+1)} \\ u_{d(p)}^{(n+1)} \end{pmatrix} = \begin{pmatrix} \lambda_1 & \bullet & \bullet & \bullet & \bullet \\ 0 & \lambda_2 & \bullet & \bullet & \bullet \\ 0 & 0 & \cdot & \bullet & \bullet \\ 0 & 0 & 0 & \lambda_{D(p)-1} & \bullet \\ 0 & 0 & 0 & 0 & \lambda_{d(p)} \end{pmatrix} \begin{pmatrix} u_1^{(n)} \\ u_2^{(n)} \\ \cdot \\ \cdot \\ u_{d(p)-1}^{(n)} \\ u_{d(p)}^{(n)} \end{pmatrix} + \begin{pmatrix} h_1 \\ h_2 \\ \cdot \\ \cdot \\ h_{d(p)-1} \\ h_{d(p)} \end{pmatrix} \quad (47)$$

A solution to the recursion relation is obtained by sequentially solving for the functions $u_{d(p)}^{(n)}$, $u_{d(p)-1}^{(n)}$, ..., $u_1^{(n)}$ which satisfy eq. (47) and the initial conditions $u_j^{(0)}$. The solution of each function in this sequence may depend on the solution of previous functions in the sequence.

A basis for solving recursion relations of this form is a set of functions $$\phi_\mu(\lambda,n) = \frac{\lambda^{n-\mu} n(n-1)\ldots(n-\mu+1)}{\mu!} \quad (48)$$

where $\lambda$ is in the set of integer eigenvalues and $\mu$ is an integer. With this definition, $\phi_0(\lambda,n)=\lambda^n$ and $\phi_0(\lambda,0)=1$ if $\mu=0$ and 0 otherwise. The function $\phi_0(\lambda,n)$ is a solution of a homogeneous recursion relation $$f^{(n+1)}=\lambda f^{(n)}. \quad (49)$$

The most general solution to an inhomogeneous recursion relation of the form $$f^{(n+1)} = \lambda f^{(n)} + \sum_{\mu\lambda'} g_{\mu\lambda'}\phi_{\mu'}(\lambda',n) \quad (50)$$

$$f^{(n)} = \gamma \phi_0(\lambda,n) + \sum_{\mu\lambda'} g_{\mu\lambda'}\chi_\mu(\lambda,\lambda',n) \quad (51)$$

where $\gamma$ is a coefficient of the most general solution of the corresponding homogeneous recursion relation and $$\chi_\mu(\lambda,\lambda',n) = \begin{cases} \phi_{\mu+1}(\lambda,n) & (\lambda=\lambda') \\ -\sum_{\tau=0}^{\mu} \left(\frac{1}{\lambda-\lambda'}\right)^{\mu+1-\sigma} \phi_0(\lambda',n) & (\lambda\neq\lambda') \end{cases} \quad (52)$$

is a particular solution of eq. (50). The coefficient $\gamma$ is chosen to satisfy the initial condition. Explicitly, $$\gamma = f^{(0)} - \sum g_{\mu\lambda'}\chi_\mu(\lambda,\lambda',0). \quad (53)$$

The expression for $\gamma$ can be simplified even further using the relationship $$\chi_\mu(\lambda,\lambda',0) = \begin{cases} 0 & (\lambda=\lambda') \\ -\left(\frac{1}{\lambda-\lambda'}\right)^{\mu+1} & (\lambda\neq\lambda') \end{cases} \quad (54)$$

Using eqs. (50)–(54), the sequential solution for the functions $u_{d(p)}^{(n)}$, $u_{d(p)-1}^{(n)}$, ..., $u_1^{(n)}$ is expressed as a linear combination of the basis functions $\phi_\mu(\lambda,n)$ with, at worst, rational coefficients.

For most purposes it is more convenient to deal with integer coefficients than with rational coefficients. In any particular use of the induction variable identifier, it is possible to determine a maximum denominator which is the largest denominator which can occur in the use of eq. (52), and scale the functions using the maximum denominator so that all coefficients are integers.

It is useful to recognize characteristics of a set of particular integer eigenvalues which are likely to be of interest in a wide variety of applications.

The eigenvalue 0 is interesting because the solution to eq. (50) for $\lambda=0$ can also be expressed as $$f^{(n)} = \sum_{\mu\lambda'} \phi_\mu(\lambda',n-1). \quad (55)$$

The eigenvalue 1 is of considerable importance because the solution to eq. (50) for $\lambda=1$ when the sum term on the right-hand side of eq. (50) is an integer constant is a linear induction variable. When the sum term on the right-hand side is a linear induction variable, the solution to eq. (50) is a quadratic induction variable, and so on. The transformed induction variables which are found for the first set of left eigenvectors for eigenvalue 1 will be linear induction variables, the transformed induction variables which are found for the second set of left eigenvectors for eigenvalue 2 will be quadratic induction variables, and so on. Thus the non-existence of a transformation to diagonalize a non-symmetric matrix which showed up in having to repeatedly find left eigenvectors for the same eigenvalue also shows up in different functional forms for transformed induction variables produced by different times at which the left eigenvectors are found.

The eigenvalue $-1$ is of interest because in a simple case it generates an induction variable which toggles back and forth between two values.

The eigenvalue 2 is of interest in computations with binary arithmetic because in a simple case it generates an induction variable which doubles each time, corresponding to a binary shift operation of a binary representation of a number.

The upper b(p) components of $y^{(n)}(p)$ are taken to be independent unknown functions of n. This is a conservative assumption, because it is possible that some set of them might be linearly independent. For example, the recursion relation $$u^{(n+1)} = 3u^{(n)} + 4n \qquad (56)$$

has the general solution $$u^{(n)} = (u^{(0)} + 1)3^n + 2n - 1 \qquad (57)$$

which is a linear induction variable only if the initial condition is accidentally given by $u^{(0)} = -1$ but not otherwise.

DISCUSSION OF A PREFERRED EMBODIMENT METHOD ILLUSTRATED IN THE FLOWCHARTS OF FIGS. 1–7

The present invention can be more fully understood with reference to the flowcharts of FIGS. 1–7, which describe the present invention in a modular fashion.

A user creates a source program or other plurality of instructions, via a step 10, in which the identification of induction variables can result in an enhanced performance. The user invokes a compiler in a step 12. The compiler utilizes the induction variable finder as part of the process of generating an object program from the source program with optimization or other enhancement of the performance made possible by the induction variable finder. In many compilers, a first significant step in compilation is carried out by a parser in a step 14 which translates the user's source code into an internal form more amenable to analysis and transformation. Possibly, after some additional analysis has been carried out by the compiler, a loop recognizer component of the compiler examines the internal form of the user's source code in a step 16 to look for one or more program loops or sequences of instructions to be repeated as long as or until some termination criterion is satisfied. When no further loops to be examined are found, the compilation is completed by remaining compiler modules in a step 18. Some optimization may be performed in the step 18. The completion of the compilation process results in the generation of object code for the user's program and completion of the compilation process in a step 22.

As each loop is selected to be examined (i.e. for each loop), the compiler uses an induction variable finder via a step 20 to search for and identify a set of induction variables. The induction variables which the induction variable finder will recognize and represent in a form useful to the compiler are linear combinations with integer coefficients of a set of simple functions of a loop counter variable which has the initial value 0 and is incremented by 1 after each time the selected loop or sequence of instructions is executed. The loop counter variable need not explicitly appear in the user's program. Any variable which increments or decrements by a constant integer value is equally suitable as a loop counter. The information describing the induction variables is stored in a form which any remaining modules of the compiler can use to optimize or otherwise enhance the performance of the user's program via a step 24.

Figure 2:
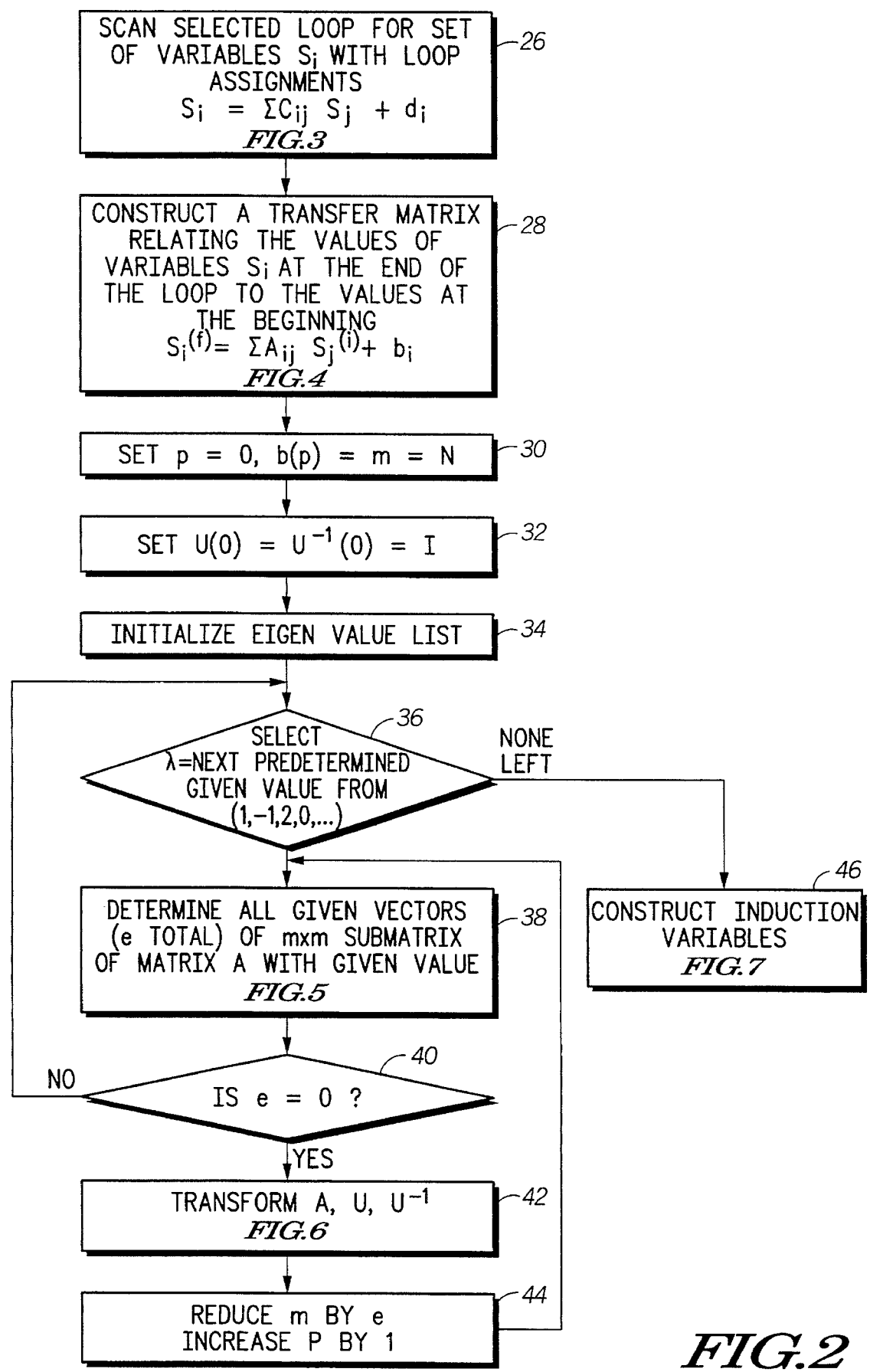

FIG. 2 describes in further detail the actions of the induction variable identifier step 20 of FIG. 1. Step 20 of FIG. 1 analyses the sequence of statements inside a loop which has been selected for analysis. A scanner (step 26) searches the internal form of the user's code built by the parser (step 14) to look for a set of potential induction variables $S_i$ which are assigned values of the form:

$$S_i = \sum_j c_{ij} S_j + d_i \qquad (58)$$

where the coefficients $c_{ij}$ and $d_i$ are integers. In general, the scanner is responsible for correctly handling side effects which may result from constructs such as function calls in the language in which the user's source code is written. The scanner is also responsible for constructing the value of each variable in the set of potential induction variables at the end of an iteration of the loop or sequence of instructions as a linear combination of the values of variables in the set of potential induction variables at the beginning of an iteration of the loop plus a constant. In another form, if the above representations of a variable cannot be achieved, then the variable is represented as a currently unknown term.

A transfer matrix constructor (step 28) is used to reduce the set of potential induction variables to a reduced set of potential induction variables and to use the information provided by the scanner (step 26) to construct a transfer matrix which represents a value of a variable in the reduced set of potential induction variables at the end of an iteration of the loop or sequence of instructions as a linear combination of the values of variables in the reduced set of potential induction variables at the beginning of an iteration of the loop plus a constant. The reduced set of potential induction variables does not include a variable whose value at the end of an iteration of the loop is not a linear combination of initial values of variables in the reduced set of potential induction variables. At the end, the transfer matrix constructor constructs an N×N transfer matrix and an integer N-component increment vector a that express the relation between final and initial values of values of the reduced set of potential induction variables according to eq. (11) above.

A transfer matrix analyzer carries out a sequence of transformations labeled by an integer transformation counter p on the transfer matrix by building and using a sequence of integer unimodular N×N matrices $U^{-1}(p)$ and $U(p)$ and producing a sequence of partially transformed transfer matrices A(p). Initialization takes place by initializing p to 0 in a step 30, initializing a partially transformed transfer matrix A(0)=A and initializing the integer unimodular N×N matrices $U^{-1}(p)$ and U(p) to the identity matrix I in a step 32, and initializing (in a step 34) a set of remaining eigenvalues to a full set of eigenvalues which a compiler designer has decided will aid in carrying out the optimizations or performance enhancements which the compiler designer has in mind. A reasonable starting eigenvalue set includes the integers −1, 0, 1, 2. An attempt is made to construct a new transformation in the sequence of transformations as long as there remain eigenvalues in the set of remaining eigenvalues.

If a selection (step 36) of a next eigenvalue finds an eigenvalue λ, an eigenvector analyzer (step 38) determines an integer number e(p) of left eigenvectors of the matrix B(p) which comes from partitioning the partially transformed transfer matrix A(p). In a conditional step 40, if e(p) is equal to 0, no left eigenvectors were found and the eigenvalue λ is removed from the set of remaining eigenvalues and the step 36 is repeated. If e(p) is non-zero, an accumulation step 42 computes the transformation matrix $U^{-1}(p+1)$, the inverse transformation matrix U(p+1), and the partially transformed matrix A(p+1). The accumulation step 42 also repartitions the partially transformed transfer matrix A(p+1). In a step 44, the transformation counter p is incremented by 1. Then the steps beginning with the action of the eigenvector analyzer 38 are applied again for the same value of $\lambda$.

When the selection 36 fails to find an eigenvalue $\lambda$, an induction variable solver 46 solves first for the transformed induction variables and then the original induction variables (see FIG. 7).

Figures 1, 3:
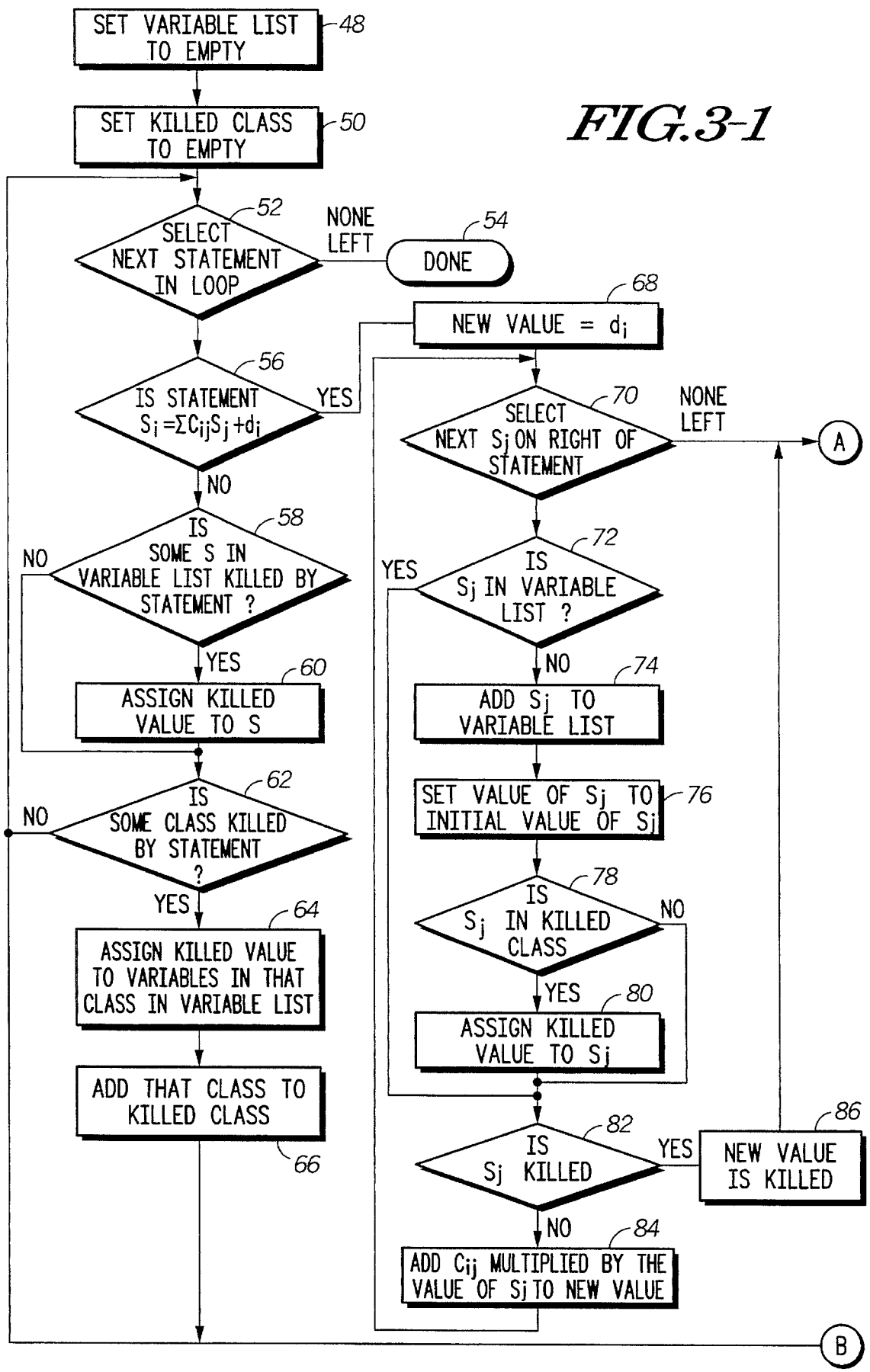
Figures 2, 3:
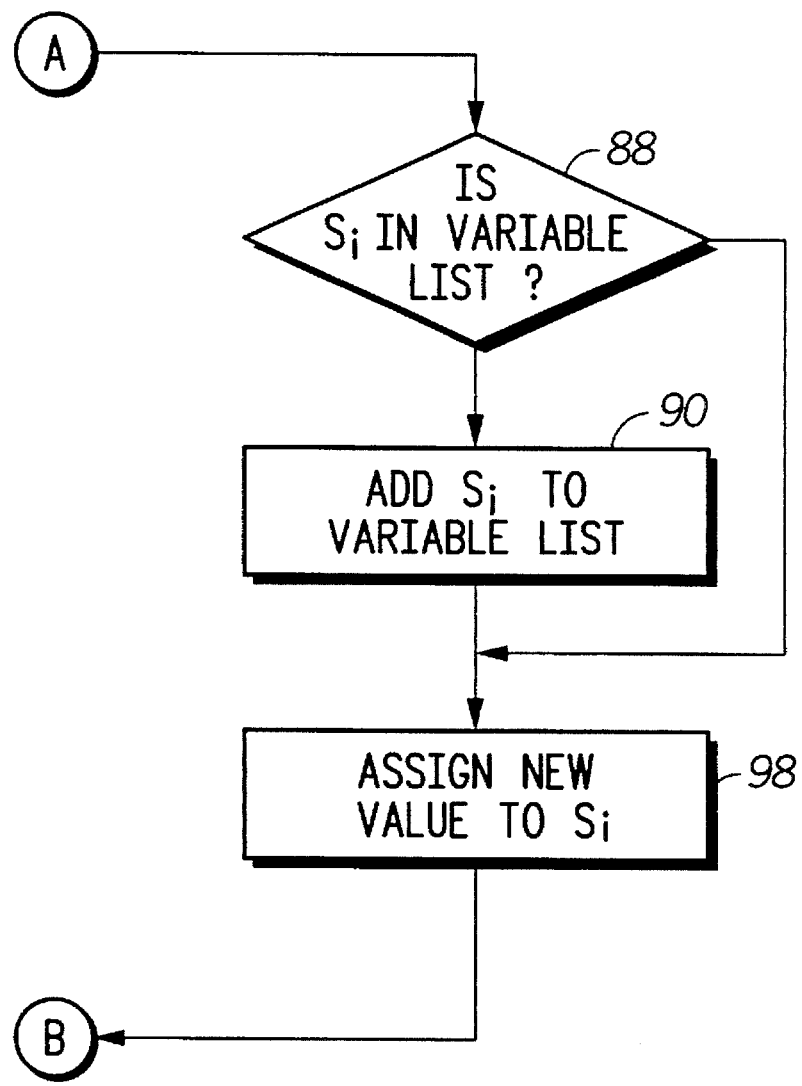

FIG. 3 illustrates in more detail the workings of the scanner (step 26), which analyzes a sequence of instructions to find all explicit and implicit assignments of values to integer variables in the sequence of instructions inside the selected loop. In languages having pointer variables, a pointer variable is considered an integer variable for this purpose. Before an execution, not necessarily the first one, of the sequence of statements, a variable $S_i$ modified in the loop has an initial value $S_i^0$. It is immaterial to the scanner whether the initial value is known at any particular time, although a subsequent optimizer may want to know the initial value before the first execution of the sequence of statements. During the scanning process, the scanner maintains a representation of the value of the variable $S_i$ as either a linear combination of initial values of variables $S_j^0$ plus an integer constant or as a killed (unknown) value. This set of values is easily represented by a list structure, wherein list elements may represent an integer coefficient and a pointer or number indicating the particular initial value or the number 1, or a killed value. An initialization step 48 initializes a list of variables to be empty, and an initialization step 50 initializes a collection of classes of variables whose values are killed or altered implicitly by language constructs to be empty. For example, a function call in the user's source code might cause the values of any global externally visible variables to be altered in a manner which the compiler could not determine, so that one class of variables might be the class of global externally visible variables. Then in an iteration procedure 52, the statements in the selected loop are examined in order. When none are left, the scanner returns the collected information in block 54 which means step 28 in FIG. 2 has been performed.

Each statement is examined in step 56 to determine if it is an assignment of the form of eq. (55). If it is not, then a determination is made in step 58 whether any variable is killed by the statement. For example, an assignment to a variable S of an expression which does not have the form of eq. (55) kills the value of s. If a variable S is killed, then the value associated with that variable is killed in step 60. Next, the statement is examined in step 62 to see if it kills the values of any class of variables. If so, the killed value is assigned to each variable in each class that the statement kills in step 64, and each class killed is added to the collection of killed classes in step 66 if the killed class is not already present from a previous operation. The process then continues with a new iteration of the iteration procedure at step 52.

If the examination of step 56 recognizes an assignment of the form of eq. (55), a goal is to represent a value of the right-hand side of the assignment in terms of a set of initial values of variables before the statements in the loop are executed. A linear combination of initial values of variables with integer coefficients plus an integer is a possible value. A killed value is another possible value. A value of the assignment is initialized to $d_i$ in step 68. Then in step 70 the variables which appear on the right-hand side of the assignment are selected in turn for examination. When no variables are left to be examined, the assignment is made starting with step 88. If, in step 72, a selected variable $S_j$ is not already in the variable list, it is added to the list in step 74 and its associated value is set to an initial value of $S_j$ in step 76. However, if $S_j$ is determined in step 78 to be in a variable class which has been killed, its initial value is instead set to the killed value in step 80. In step 82, the value of $S_j$ is checked to see if it is the killed value. If not, then the value of the right-hand side is incremented by the coefficient $c_{ij}$ times the value of $S_j$ in step 84, and the analysis of the right-hand side of the assignment is continued for the next variable in step 70. If step 82 determines that the value of $S_j$ is the killed value, then it is not necessary to evaluate any more terms in the right-hand side of the assignment, and the killed value is assigned in step 86.

In step 88, a check is made to see if the variable $S_i$ to which the assignment is made is already in the variable list. If not, it is added to the list in step 90. The value of the right-hand side of the assignment is assigned to the variable in step 98, and the step 52 examines the next statement in the sequence of statements.

Figure 4:
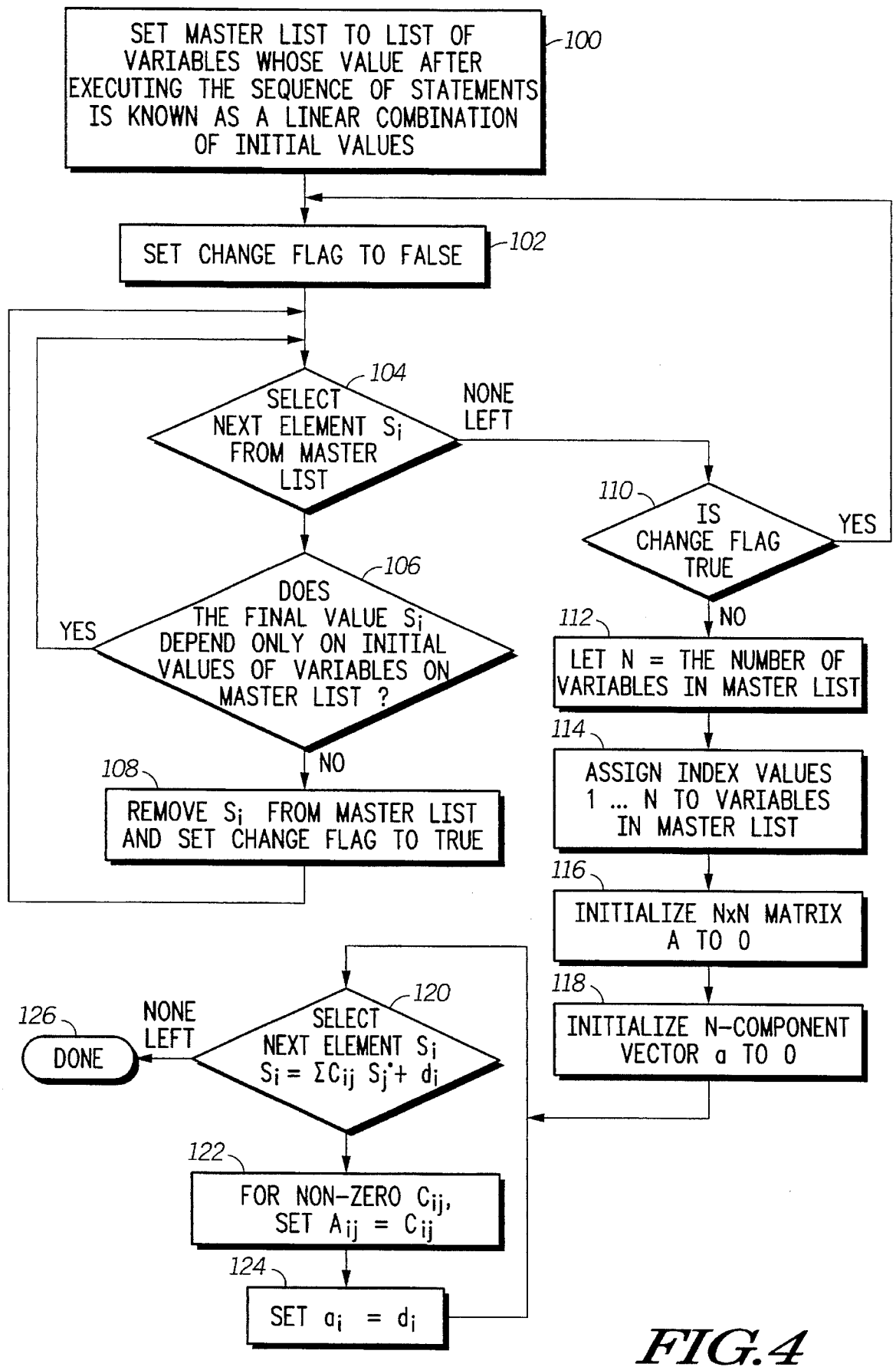

FIG. 4 describes in more detail the transfer matrix constructor (step 28 of FIG. 2) which uses the values of variables determined by the scanner to determine the reduced set of potential induction variables and construct the integer N×N transfer matrix A and the integer N-component increment vector a which satisfy eq. (11). The initial step 100 is to create a master list of all variables whose values after executing the sequence of instructions are not killed. A bit-vector representation, in which each variable is associated with a single bit in the bit vector, is an economical representation. In step 102, a change flag is set to FALSE. In step 104, a next variable is selected from the master list. If a variable is present in the list, then its value representation is checked in a step 106 to see if it depends on the initial value of any variables not in the list. If not, step 104 is repeated for the next variable in the master list. If so, then in a step 108, the selected variable is removed from the master list, the change flag is set to TRUE, and step 104 is repeated for the next variable. When all variables have been selected from the variable list, a step 110 checks to see if the change flag is TRUE. If it is, then step 102 is to be repeated. Otherwise, the master list now contains the reduced set of potential induction variables.

In step 112, N is set to the number of variables in the master list, and in step 114 an index from 1 to N is assigned to each variable. In step 116, an N×N transfer matrix A and in step 118 an N-component vector a are initialized to 0. In step 120, the next variable is selected from the master list. Since it is in the master list, its value after the execution of the sequence of statements is known to be of the form $$\sum_j c_{ij} S_j^0 + d_i.$$

As long as there is a next variable $S_i$, step 122 sets the transfer matrix elements $A_{ij}$ to the values of the $c_{ij}$ in the sum and step 124 sets the vector component $a_i$ to the value of $d_i$. When there are no variables left to be selected from the master list, the scanner's task is finished at step 126.

Figure 5:
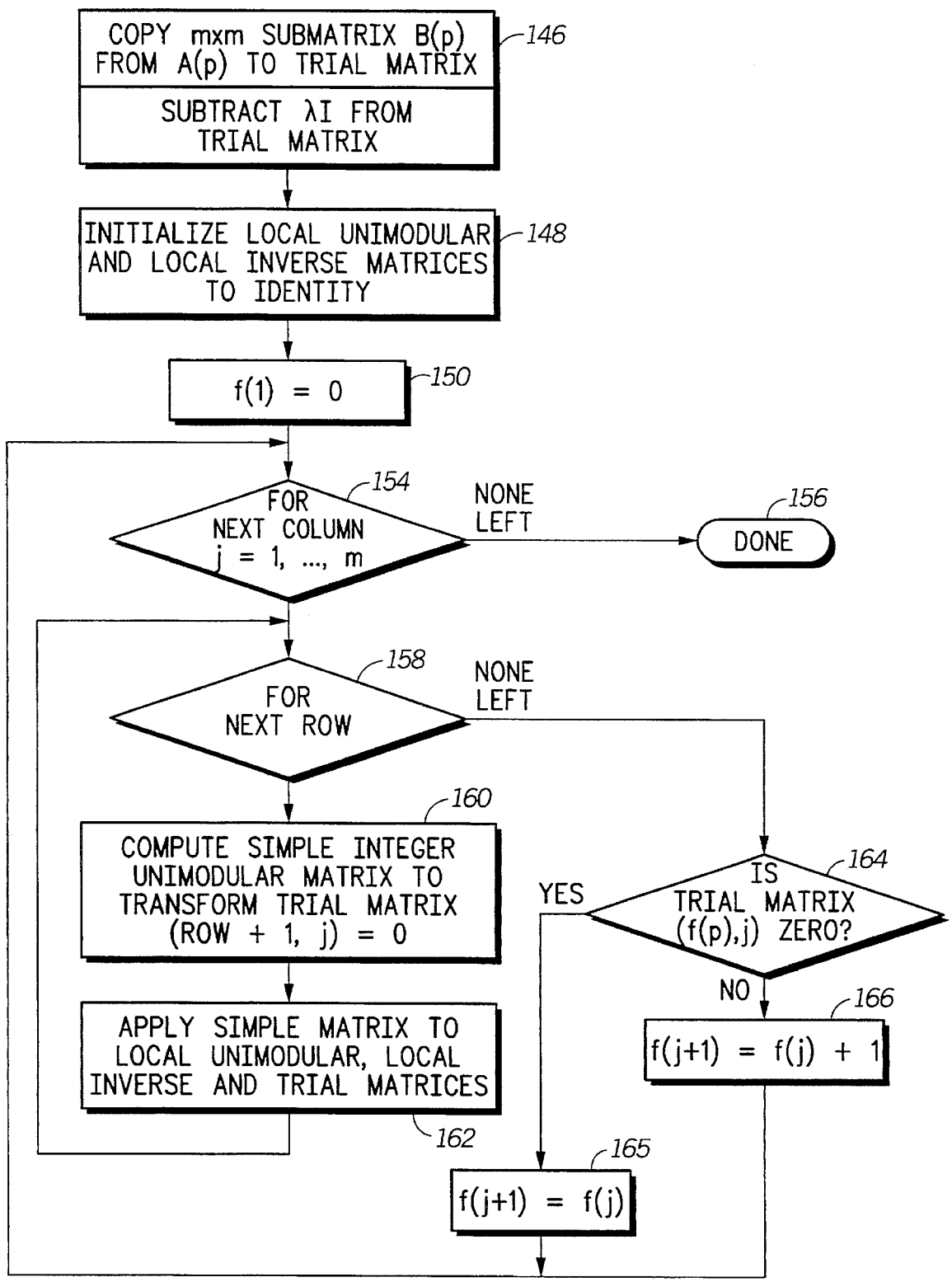

FIG. 5 describes in more detail the eigenvector analysis which determines all left eigenvectors of the b(p)×b(p) integer matrix B(p) which is obtained by partitioning the partially transformed transfer matrix A(p) as shown in eq. (19) and illustrated in step 38 of FIG. 2. In step 146, a copy of the matrix B(p) is made because the sequence of transformations which is made will change the matrix, and the eigenvalue $\lambda$ is subtracted from the diagonal elements. In step 148, the transformation matrices V(p) and $V^{-1}$(p) are initialized to the identity matrix. In step 150, the number of elements of the eigenvector w which are known to vanish before a reduction is made on column 1 is set to $f(1)=0$.

A sequence of column reductions over columns j=1 to j=b(p)=m is carried out starting in step 154. A sequence of annihilations is carried out for column j, rows k=b(p),b(p−1),...,$f$(j)+2 in step 158. For each annihilation, the matrices $S^{-1}(p,j,k)$ and $S(p,j,k)$ described in section 6 are computed using the method derived from the theory of continued fractions. Each transformation which is applied to the matrix which is initially $(B(p)-\lambda I)$ in step 160 is also applied to the transformation matrices $V(p)$ and $V^{-1}(p)$ in step 162. In carrying out these transformations, it is not necessary to do a general matrix multiplication. The effect of multiplying a matrix by $S^{-1}(p,j,k)$ from the left is equivalent to replacing each of the rows k−1 and k of the original matrix by linear combinations of the original rows k−1 and k and the effect of multiplying a matrix by $S(p,j,k)$ from the right is equivalent to replacing each of the columns k−1 and k of the original matrix by linear combinations of the original columns k−1 and k.

When all annihilations have been done, step 164 determines whether the matrix element in column j, row $f$(j)+1 is zero. If it is, step 165 computes $f$(j+1)=$f$(j), while if it is not, step 166 computes $f$(j+1)=$f$(j)+1.

When all column reductions have been completed, in step 155, the number of left eigenvectors found is $e(p)=b(p)-f(b(p)+1)$, and the transformation matrices $V(p)$ and $V^{-1}(p)$ have been computed correctly.

FIG. 6 isolates the computation which is performed when the eigenvector analysis found at least one left eigenvector and is a more detailed description of step 42 of FIG. 2. If the previous matrices $U(p)$ and $U^{-1}(p)$ have the forms expressed in eq. (26), the new matrices $A(p+1)$, $U(p+1)$, and $U^{-1}(p+1)$ are computed using eqs. (27)–(29).

FIG. 7 illustrates the sequence of operations by which the induction variables are found as illustrated previously by the step 46 of FIG. 2. The transformed induction variables $y^{(n)}(p)$ are divided into two parts. The upper $b(p)$ components of $y^{(n)}(p)$ are taken to be independent unknown functions of n in step 170. In step 172, a vector h is computed as the $d(p)$-component vector whose components are the lower $d(p)$ components of the vector $U^{-1}(p)a$. In step 174, the next value k in the sequence $d(p), d(p)-1, \ldots, 1$ is selected. In step 176, the transformed induction variable corresponding to row k of eq. (47) is solved in terms of any previously solved for transformed induction variables using eqs. (51)–(53). The step 176 is possible because the form of the matrix in eq. (47) has elements below the diagonal which are 0 and because the previously solved for transformed induction variables have solutions which are linear combinations of the functions $\phi_\mu(\lambda,n)$. In carrying out this computation, some of the coefficients are rational numbers rather than integers. At this stage of the computation it is straightforward to either do the computation using exact arithmetic for rational numbers or to do a preliminary scaling of the numbers so that all numbers will be integers.

When all of the components of $y^{(n)}(p)$ have been computed as a linear combination of the functions $\phi_\mu(\lambda,n)$, step 178 applies the transformation $x^{(n)}=U(p)y^{(n)}(p)$ to express the original variables as a linear combination of the functions $\phi_\mu(\lambda,n)$. These expressions are returned to the compiler in step 180.

AN EXAMPLE OF THE METHOD DISCUSSED ABOVE

To one who is not skilled in compiler art or to one who is not skilled in advanced linear algebra, the above method may seem cumbersome or complex. To allow one to further understand the method taught above, the following example is provided.

As an example, consider a sequence of statements present inside a loop in a user's source code:

$f=f+g$ $g=f-g$ $m=m+2*i-j$ $i=2*i+j+1$ $j=i+2*j$ $k=2*k+i+j$ where before the loop is executed the first time the values of the variables are f=g=m=i=j=k=1.

The scanner (FIG. 3) recognizes the set of potential induction variables as the variables f, g, m, i, j and k. Further, it determines the value of each of these variables f', g', m', i', j' and k' after the sequence of statements is executed once in terms of the values f, g, m, i, j, k before the sequence is executed as:

$f'=f+g$ $g'=f$ $m'=m+2*i-j$ $i'=2*i+j+1$ $j'=2*i+3*j+1$ $k'=2*k+4*i+4*j+2.$

The transfer matrix constructor (FIG. 4) determines that each of the 6 variables f, g, m, i, j and k is in the reduced set of potential induction variables and constructs a 6×6 transfer matrix A and a 6-component vector a which show the relationship $$\begin{pmatrix} f' \\ i' \\ m' \\ g' \\ k' \\ j' \end{pmatrix} = \begin{pmatrix} 1 & 0 & 0 & 1 & 0 & 0 \\ 0 & 2 & 0 & 0 & 0 & 1 \\ 0 & 2 & 1 & 0 & 0 & -1 \\ 1 & 0 & 0 & 0 & 0 & 0 \\ 0 & 4 & 0 & 0 & 2 & 4 \\ 0 & 2 & 0 & 0 & 0 & 3 \end{pmatrix} \begin{pmatrix} f \\ i \\ m \\ g \\ k \\ j \end{pmatrix} + \begin{pmatrix} 0 \\ 1 \\ 0 \\ 0 \\ 2 \\ 1 \end{pmatrix}$$
$$\qquad\qquad\qquad A \qquad\qquad\qquad\qquad\qquad\qquad a$$

There is no particular significance to the order in which the index values 1–6 are assigned to the 6 variables, (i.e., the rows of the above matrix may be shuffled uniformly, provided that the column are correspondingly adjusted).

The initial unimodular integer matrices $U(0)$ and $U^{-1}(0)$ are both the identity matrices, and $A(0)=A$. The transfer matrix analyzer (FIGS. 5, 6) carries out a set of transformations. The initial value of the transformation counter is p=0, the initial unimodular integer matrices $U(0)$ and $U^{-1}(0)$ are both the identity matrices, and $A(0)=A$ as described above. In the present example, it is assumed that the eigenvalues to be tried are drawn from the set {0, 1, −1, 2}, a reasonable choice for a designer to make. It should be noted that any integer eigenvalues or any number of eigenvalues may be chosen.

The first eigenvalue selected by the transfer matrix analyzer is 0. The eigenvalue analyzer (FIGS. 5, 6) finds no left eigenvectors for this eigenvalue.

The next eigenvalue selected by the transfer matrix analyzer is 1. The eigenvalue analyzer finds one left eigenvector for this eigenvalue. The partially transformed matrix A(1) and the unimodular integer matrices U(1) and $U^{-1}(1)$ are found by the eigenvalue analyzer to be $$\begin{pmatrix} 0 & 0 & -1 & 0 & 0 & 0 \\ 0 & 4 & 0 & 0 & 0 & -1 \\ -1 & 0 & 1 & 0 & 0 & 0 \\ 0 & 4 & 0 & 2 & 0 & -2 \\ 0 & 6 & 0 & 0 & 1 & -3 \\ 0 & 0 & 0 & 0 & 0 & 1 \end{pmatrix} \cdots$$
$$A(1)$$

$$\begin{pmatrix} 0 & 0 & 0 & -1 & 0 & 0 \\ 0 & -1 & 0 & 0 & 0 & 0 \\ 1 & 0 & 0 & 0 & 0 & 0 \\ 0 & 0 & 0 & 0 & -1 & 2 \\ 0 & 0 & 1 & 0 & 0 & -1 \\ 0 & -2 & 0 & 0 & 0 & 1 \end{pmatrix} \cdots$$
$$U^{-1}(1)$$

$$\begin{pmatrix} 0 & 0 & 1 & 0 & 0 & 0 \\ 0 & -1 & 0 & 0 & 0 & 0 \\ 0 & -2 & 0 & 0 & 1 & 1 \\ -1 & 0 & 0 & 0 & 0 & 0 \\ 0 & -4 & 0 & -1 & 0 & 2 \\ 0 & -2 & 0 & 0 & 0 & 1 \end{pmatrix}$$
$$U(1)$$

and the transformation counter is incremented to p=1, b(1)=5, d(1)=1. Since a left eigenvector was found, the transfer matrix analyzer selects the eigenvalue 1 again.

The eigenvalue analyzer again finds one left eigenvector for this eigenvalue. The partially transformed matrix A(2) and the unimodular integer matrices U(2) and $U^{-1}(2)$ are found by the eigenvalue analyzer to be:

$$\begin{pmatrix} 0 & 0 & -1 & 0 & 0 & 0 \\ 0 & 8 & 0 & -2 & 3 & 0 \\ -1 & 0 & 1 & 0 & 0 & 0 \\ 0 & 12 & 0 & -2 & 6 & 0 \\ 0 & 0 & 0 & 0 & 1 & 1 \\ 0 & 0 & 0 & 0 & 0 & 1 \end{pmatrix} \cdots$$
$$A(2)$$

$$\begin{pmatrix} -1 & 0 & 0 & 0 & 0 & 0 \\ 0 & 1 & 1 & 0 & 1 & -3 \\ 1 & 0 & 0 & 1 & 0 & 0 \\ 0 & 0 & 2 & 0 & 3 & -8 \\ 0 & -2 & -1 & 0 & 0 & 1 \\ 0 & -2 & 0 & 0 & 0 & 1 \end{pmatrix} \cdots$$
$$U^{-1}(2)$$

$$\begin{pmatrix} -1 & 0 & 0 & 0 & 0 & 0 \\ 0 & 3 & 0 & -1 & 1 & 0 \\ 0 & 0 & 0 & 0 & -1 & 1 \\ 1 & 0 & 1 & 0 & 0 & 0 \\ 0 & 16 & 0 & -5 & 6 & 2 \\ 0 & 6 & 0 & -2 & 2 & 1 \end{pmatrix}$$
$$U(2)$$

and the transformation counter is incremented to p=2, b(2)=4, d(2)=2 Since a left eigenvector was found, the transfer matrix analyzer selects the eigenvalue 1 again. This time, no left eigenvector is found, so the transform analyzer selects the eigenvalue −1. This time, no left eigenvector is found, so the transform analyzer selects the eigenvalue 2.

The eigenvalue analyzer finds one left eigenvector for this eigenvalue of 2. The partially transformed matrix A(3) and the unimodular integer matrices U(3) and $U^{-1}(3)$ are found by the eigenvalue analyzer to be $$\begin{pmatrix} -1 & 0 & -1 & 0 & 0 & 0 \\ 0 & 4 & 0 & 2 & -3 & 0 \\ 1 & 0 & 2 & 0 & 0 & 0 \\ 0 & 0 & 0 & 2 & 0 & 0 \\ 0 & 0 & 0 & 0 & 1 & 1 \\ 0 & 0 & 0 & 0 & 0 & 1 \end{pmatrix} \cdots$$
$$A(3)$$

$$\begin{pmatrix} -1 & 0 & 0 & -1 & 0 & 0 \\ 0 & -1 & -1 & 0 & -1 & 3 \\ 3 & 0 & 0 & 2 & 0 & 0 \\ 0 & -2 & 0 & 0 & 1 & -2 \\ 0 & -2 & -1 & 0 & 0 & 1 \\ 0 & -2 & 0 & 0 & 0 & 1 \end{pmatrix} \cdots$$
$$U^{-1}(3)$$

$$\begin{pmatrix} 2 & 0 & 1 & 0 & 0 & 0 \\ 0 & -1 & 0 & -1 & 1 & 0 \\ 0 & 0 & 0 & 0 & -1 & 1 \\ -3 & 0 & -1 & 0 & 0 & 0 \\ 0 & -6 & 0 & -5 & 6 & 2 \\ 0 & -2 & 0 & -2 & 2 & 1 \end{pmatrix}$$
$$U(3)$$

and the transformation counter is now incremented to p=3, b(3)=3, d(3)=3. Since a left eigenvector was found, the transfer matrix analyzer selects the eigenvalue 2 again. No left eigenvector is found and there are no further eigenvalues left to be tried, so the next step is to find the transformed induction variables as illustrated in FIG. 7.

The upper b(3)=3 components (see the lines in the matrix A(3) above) are independent unknown functions of n, which may be called $\psi_1(n)$, $\psi_2(n)$, $\psi_3(n)$.

The lower d(3)=3 components (see the lines in the matrix A(3) above) require computation of the d(3)=3 component vector h which is the lower components of the vector $U^{-1}(3)a$ and the d(3)=3 component vector c which is the lower components of the product of $U^{-1}(3)$ with the initial values of the original variables in the reduced set of potential induction variables. For this example, $$h = \begin{pmatrix} -2 \\ -1 \\ -1 \end{pmatrix} \quad c = \begin{pmatrix} -3 \\ -2 \\ -1 \end{pmatrix}$$

and the transformed induction variables are found by solving sequentially the recursion relation $$\begin{pmatrix} u_1^{(n+1)} \\ u_2^{(n+1)} \\ u_3^{(n+1)} \end{pmatrix} = \begin{pmatrix} 2 & 0 & 0 \\ 0 & 1 & 1 \\ 0 & 0 & 1 \end{pmatrix} \begin{pmatrix} u_1^{(n)} \\ u_2^{(n)} \\ u_3^{(n)} \end{pmatrix} + \begin{pmatrix} -2 \\ -1 \\ -1 \end{pmatrix} \text{ with}$$

$$\begin{pmatrix} u_1^{(0)} \\ u_2^{(0)} \\ u_3^{(0)} \end{pmatrix} = \begin{pmatrix} -3 \\ -2 \\ -1 \end{pmatrix}$$

The first transformed induction variable found is $u_3^{(n)}$ which satisfies the recursion relation:

$$u_3^{(n+1)} = u_3^{(n)} - \phi_0(1,n).$$

The solution using eq. (51) is
and the value $\gamma = -1$ is determined from eq. (52), leaving $$u_3^{(n)} = -\phi_0(1,n) - \phi_1(1,n).$$

The next transformed induction variable found is $u_2^{(n)}$ which satisfies the recursion relation $$u_2^{(n+1)} = u_2^{(n)} + (-\phi_0(1,n) - \phi_1(1,n)) - \phi_0(1,n).$$

The solution using eq. (51) is $$u_2^{(n)} = \gamma \phi_0(1,n) - 2\phi_1(1,n) - \phi_2(1,n)$$

and the value $\gamma = -2$ is determined from eq. (52), leaving $$u_2^{(n)} = -2\phi_0(1,n) - 2\phi_1(1,n) - \phi_2(1,n)$$

The next transformed induction variable found is $u_1^{(n)}$ which satisfies the recursion relation $$u_1^{(n+1)} = 2u_1^{(n)} - 2\phi_0(1,n).$$

The solution using eq. (51) is $$u_1^{(n)} = \gamma \phi_0(2,n) + 2\phi_0(1,n)$$

and the value $\gamma = -5$ is determined from eq. (52), leaving $$u_1^{(n)} = -5\phi_0(2,n) + 2\phi_0(1,n).$$

The upper $b(3)=3$ and lower $d(3)=3$ components are assembled to form the transformed induction variable vector $$y_1^{(n)} = \begin{pmatrix} \psi_1(n) \\ \psi_2(n) \\ \psi_3(n) \\ -5\phi_0(2,n) + 2\phi_0(1,n) \\ -2\phi_0(1,n) - 2\phi_1(1,n) - \phi_2(1,n) \\ -\phi_0(1,n) - \phi_1(1,n) \end{pmatrix}$$

This is transformed back using the unimodular integer matrix U(3) to give the induction variables $$\begin{pmatrix} f^{(n)} \\ i^{(n)} \\ m^{(n)} \\ g^{(n)} \\ k^{(n)} \\ j^{(n)} \end{pmatrix} = x^{(n)} = U(3)y^{(n)} =$$

$$\begin{pmatrix} 2\psi_1(n) + \psi_3(n) \\ -\psi_2(n) + 5\phi_0(2,n) - 4\phi_0(1,n) - 2\phi_1(1,n) - \phi_2(1,n) \\ \phi_0(1,n) + \phi_1(1,n) + \phi_2(1,n) \\ -3\psi_1(n) - \psi_3(n) \\ -6\psi_2(n) + 25\phi_0(2,n) - 24\phi_0(1,n) - 14\phi_1(1,n) - 6\phi_2(1,n) \\ -2\psi_2(n) + 10\phi_0(2,n) - 9\phi_0(1,n) - 5\phi_1(1,n) - 2\phi_2(1,n) \end{pmatrix}$$

Although none of these is a linear induction variable, the linear combination $2i^{(n)} - j^{(n)} = \phi_0(1,n) + \phi_1(1,n)$ is a linear induction variable and a use of the linear combination can be used by a compiler for optimizing or enhancing the performance of the user's program.

HARDWARE USED TO IMPLEMENT THE METHOD TAUGHT HEREIN IN A PREFERRED FORM

FIG. 8 illustrates a data processing system having a central processing unit (CPU) 200 which is coupled to a bus comprising address, data, and/or control lines. The bus is coupled to a memory section 202. The memory contains a user program portion 204 and a induction variable processor 206. The induction variable processor 206 accesses the user program portion 204 to perform the induction variable processes discussed above.

In summary, the FIGS. herein provide a method and apparatus for finding induction variables or induction variable properties of user code. With such a method and apparatus, the source code of a user's program can be more completely analyzed for induction variables. The principal novel features are the ability to analyze assignment statements involving potential induction variables which are linear combinations of other potential induction variables with integer coefficients, the construction of the transfer matrix, the transfer matrix analyzer which controls the generation of a sequence of integer unimodular transformations according to a set of predetermined integer eigenvalues, an eigenvector analyzer which generates the sequences of simple unimodular integer matrices which multiplied together give the overall unimodular integer matrices, the use of continued fraction theory to generate the simple unimodular matrices, the construction of transformed induction variables, and the transformation to the original induction variables using the integer unimodular transformation matrix.

The major advantages of this invention are the ability to find all non-accidental induction variables for a given loop, whether the original variables are linear induction variables or not; the ability to examine a larger class of statements to find induction variables due to the generality of eq. (58), the ability to find induction variables in the presence of rational or complex eigenvalues of the transfer matrix, the ability to find more complicated induction variables more simply than was possible previously, the ability to represent induction variables so that linear combinations of induction variables can be examined as induction variables, and the ability to handle different kinds of induction variables all within the same framework.

While the present invention has been shown and described with reference to specific embodiments, further modifications and improvements will occur to those skilled in the art. For use with different languages or integrated into different compilers, the details of the scanner could be carried out in different ways. It should ultimately produce a representation of the linear combinations of values which can be used to produce a transfer matrix, but a number of alternatives are possible. The process of scanning for variables may be done in a series of passes rather than one pass, and alternative mechanisms for marking variables as killed are possible. For example, in many circumstances, it is desirable to make a preliminary scan to find out what variables one is interested in so that it is possible to use an array representation rather than a list representation of the variables. In many circumstances, it is desirable to make a preliminary scan to find out what variables are unchanged in a loop so that their values, if known, may be propagated in carrying out the scanning process. It is also quite straightforward to allow the statements scanned to include conditional execution statements, which increases the amount of code which can be successfully analyzed. Modifications to allow pointers to be treated properly are needed for some languages. The present description still applies, as long as eq. (58) is understood to also allow the presence of type-changing operators. Modifications of all these kinds serve only to change somewhat the style in which the identification of variables is made and the range of contexts in which the identification can be made and is within the scope of the above teachings.

In many practical circumstances, the scanning process may be carried out by performing a walk through an abstract syntax tree which represents the user's program. The induction variable finder requires that the scanning process be able to carry out the identification process in step 56, but is insensitive to how that is actually implemented.

In constructing the transfer matrix, the choice was made to include in the reduced set of potential induction variables those variables whose values at the beginning of a loop were not needed for computing the final value of some potential induction variable. These will correspond to eigenvalue-0 variables. It is possible to use a slight variation of the transfer-matrix construction process to exclude these variables either in the process of constructing the matrix or just after it has been constructed. The advantage to doing that is that somewhat smaller transfer matrices will require somewhat less computational time. However, for purposes of optimizing the user's code, it may be useful to know explicitly about the eigenvalue-0 variables (for example, so that one can eliminate them by unrolling the loop one or more times). In addition, there may be some eigenvalue-0 transformed variables even if there are no eigenvalue-0 variables, so that it may be more convenient to not have eigenvalue-0 variables treated in two different ways.

The order in which variables are put into the variable vector is immaterial. The specific matrices which are built during the process depend on the order, and the specific ways in which unknown functions are assigned may cause the form of induction variables to appear to have different forms, but the information which would make a difference to optimization methods will be identical. This is actually an advantage of this method, since it does not make a difference to the strength of the conclusions how this order is determined.

The advantage of the simple integer unimodular transformation matrices was done in a somewhat arbitrary way. In the representation shown in eq. (38), the key features are the block structure and the relative magnitudes of the coefficients. Various other choices of signs of the coefficients would preserve the unimodularity of the matrix, as would replacement of the identity matrices by arbitrary integer unimodular matrices and their inverses. The sign changes are an insignificant change, and the replacement of the identity matrices would increase the work required to carry out the transformations without offering other benefits.

Once the work of bring the transfer matrix to its final partially transformed form has been done, all of the operations can be carried out equally well for symbolic expressions as for integers.

The matrix operations were described in terms of finding left eigenvectors using a sequence of column reductions. An equally good alternative description could be made in terms of finding right eigenvectors using a sequence of row reductions. The reductions in either case could start at either end of the matrix or be carried out in some other order.

It is important to note herein that the use of unimodular integer transformation matrices is a significant performance enhancement. However, the theory, methods, and apparatus taught herein can easily incorporate (with some performance degradation) rational or fractional matrices to perform the transformations taught herein or like induction variable optimization.

The composition of transformation as exemplified, by eq. (33) is expressed in terms of matrix multiplication. Multiplication by an annihilation matrix of the form of eq. (38) is simply carried out as a row or column operation. Multiplication of a series of matrices is often efficiently carried out by a series of row or column operations, provided that the association of matrices in the matrix product is made in the correct order.

The description above is written assuming a simple representation for the known functions of n. The choice of this representation in a particular implementation of this invention could be quite different as long as it permits the simple operations of addition, subtraction, and multiplication by constants. In addition, the description here has focused on the representation of values needed in finding the induction variables. In most cases, this representation will be allow a larger range of values than those needed for finding induction variables.

Herein, assignment statements are discussed as having a left and right side wherein the left side is the variable(s) to be assigned and on the right side is the expression to be calculated and assigned to the left side variable(s). This "left/right" notation is not always the syntax in the prior art of computer programming. For instance, in some cases the right side may be the variable to be assigned and the left side may by the expression to be computed. In other forms, no right or left side exists or can be easily determined. For example, the C statement "i++" means "i=i+1" in other languages. Therefore, arguably "i++" has no left or right side separated by an assignment operator such as =. In other cases, instructions may have the syntax of "add R1, R2, R3"

wherein this syntax is interpreted in other languages is being "R3=R1+R2". Therefore, the invention discussed herein should not be limited due to assignment syntax and all assignment syntactical expressions can be handled via the methods and apparatus taught herein. Basically, an assignment statement as used herein is any instruction or plurality of instructions which assigns one or more variables to a one or more values.

The software discussed herein can be stored on any magnetic media or memory media such as hard disks, floppy disks, 3.5" disks, storage tapes, magnetic drums, static random access memory (SRAM) cells, dynamic random access memory (DRAM) cells, electrically erasable (EEPROM, EPROM, flash) cells, nonvolatile cells, ferroelectric or ferromagnetic memory, compact disks, laser disks, optical disks, and the like.

It is to be understood, therefore, that this invention is not limited to the particular forms shown and that it is intended in the appended claims to cover all modifications that do not depart from the spirit and scope of this invention.

A COMPARISON OF THE ABOVE DISCLOSED METHOD TO THE BACKGROUND MATERIAL

Previous calculations of induction variables have been limited in the scope or ease of determination of induction variables which they could find and have been limited to finding induction variables when they occur as user variables.

The paper "Beyond Induction Variables" by Michael Wolfe, ACM Sigplan 92, p. 162 describes a prior state-of-the-art method for computing induction variables. His analysis uses the static-single-assignment form and his work has several limitations: it is limited to a sequence of assignments of the form Scalar=Scalar+constant, as stated on p. 165 of Wolfe's article. The disadvantages of this form is that it is not very general. The right-hand side may have only one term, and its coefficient is unity. In contrast, the method taught herein allows the much more general linear combination of eq. (58) which allows multiple terms on the right-hand side with different integer constants.

While Wolfe's work does make it possible to find quadratic induction variables, his method works only in the presence of the restriction noted above and requires the solution of matrix equations. In the method taught herein, this result follows immediately from eq. (52). Similarly, Wolfe's analysis is able to determine some geometric induction variables, but only by keeping track of coefficients of powers of induction variables. In the method taught herein, that is done automatically and inherently in the process.

Further, Wolfe's method is able to look for flip-flop induction variables, but again with the restrictions noted above. In addition, this is a special case to be looked for by the method of Wolfe. In the method taught herein, the flip-flop variables are found using the same analysis that is used for all induction variables.

Wolfe's methods also use methods which require generation of inverse matrices of integer matrices. Since his matrices are not unimodular matrices, his methods introduce fractions when the inverse matrix is computed. The method taught herein avoids the use of fractions as much as is possible by using unimodular matrices. This is a great efficiency win, since it is easier to carry out operations on integer matrices than on matrices with more general rational coefficients.

Finally, Wolfe's methods do not find induction variables when the user's original variable are not induction variables. The method taught herein finds induction variables whenever they are present and not accidental induction variables. The example provided above shows a case where two user variables have forms which are not linear induction variables, but where a particular linear combination of them is a linear induction variable. This example would not have had anything useful recognized by Wolfe's method, while the method taught herein completely categorized all induction variables.

What is claimed is:

1. A method for determining induction variables comprising the steps of:

accessing a file stored in computer memory, the file containing several program statements wherein a plurality of the program statements are to be executed in a looping execution flow by a central processing unit (CPU);

parsing the file to produce a representation of the program statements contained in the file, the representation being stored in computer memory;

identifying, from the representation in computer memory, the plurality of program statements which is to be executed in a looping execution flow;

identifying a set of potential induction variables within the plurality of the program statements within the looping execution flow;

reducing the set of potential induction variables to a reduced set of potential induction variables wherein a potential induction variable in the reduced set of potential induction variables has a value at the end of any execution of the loop which is representable as a sum of constant integer coefficients multiplied by the values of other potential induction variables in the reduced set of potential induction variables at the start of that execution of the loop;

creating a transfer matrix A in computer memory which represents the relationships of the values of the potential induction variables in the reduced set of potential induction variables at the end of an execution of the loop to the values of the potential induction variables in the reduced set of potential induction variables at the start of that execution;

transforming the transfer matrix A from computer memory to a transformed matrix A' in computer memory wherein the transformed matrix A' is easier to analyze for induction variables than the transfer matrix A, the transforming being performed by using an integer unimodular transformation, the reduced set of potential induction variables being transformed to a set of potential transformed induction variables by the same integer unimodular transformation;

analyzing the matrix A' to find transformed induction variables and transformed non-induction variables wherein the value of a transformed induction variable at the beginning of the Nth execution of the loop is a linear combination of a predetermined set of functions of N and wherein each non-induction variable defines an undetermined independent function of N; and applying the inverse of the transformation to the sets of transformed induction variables and transformed non-induction variables thereby expressing each of the variables in the reduced set of potential induction variables as a linear combination of the predetermined functions of N and the undetermined independent functions of N.

2. The method of claim 1 wherein the step of transforming the transfer matrix A to a transformed matrix A' comprises:

creating an integer unimodular matrix U in computer memory which has an inverse matrix $U^{-1}$ that is also an integer unimodular matrix and using matrix multiplication between matrices A, U, and $U^{-1}$ to transform the matrix A to the matrix A'.

3. The method of claim 2 wherein the step of transforming the transfer matrix A to a transformed matrix A' comprises:

finding A' wherein A' is calculated by performing the matrix operation $U^{-1} \cdot A \cdot U$.

4. The method of claim 3 wherein the step of transforming the transfer matrix A to a transformed matrix A' comprises:

exposing eigenvalues and eigenvectors of matrix A' or a submatrix of A' using the matrices U and $U^{-1}$.

5. The method of claim 1 wherein the step of analyzing the matrix A' to find transformed induction variables and transformed non-induction variables comprises:

reducing at least one entry in the matrix A' from a non-zero integer value to a zero integer value by iteratively processing matrix A' using at least one eigenvalue in a set of predetermined eigenvalues.

6. The method of claim 5 wherein the step of reducing at least one entry in the matrix A' from a non-zero integer value to a zero integer value comprises:

iteratively processing the matrix A' using the eigenvalues of 1, −1, 2, and 0.

7. The method of claim 1 wherein the step of accessing a file stored in computer memory, the file containing several program statements wherein a plurality of the program statements are to be executed in a looping execution flow comprises:

accessing the plurality of program statements wherein the program statements contain a plurality of looping structures wherein each looping structure is processed.

8. The method of claim 7 wherein the step of accessing a file stored in computer memory, the file containing several program statements wherein a plurality of the program statements are to be executed in a looping execution flow comprises:

accessing the plurality of program statements wherein the program statements contain a plurality of looping structures wherein at least two of the plurality of looping structures are organized as nested loops wherein one looping structure lies within another looping structure.

9. The method of claim 1 further comprising the step of:

using a compiler which receives as input the induction variables and processes the induction variables to optimize the execution of the loop.

10. The method of claim 1 further comprising the step of:

using means for optimizing, which receives as input the induction variables and processes the induction variables, to optimize the execution of the loop to improve one of either speed of execution, parallel execution efficiency, and cache memory performance.

11. A method for processing induction variables, the method comprising the steps of:

(a) providing a user source code in computer memory;

(b) parsing the user source code via means for parsing which is stored in computer memory to find a loop in the user source code, the loop being a portion of the user source code which selectively executes several times in sequence via a central processing unit (CPU) depending upon evaluation of an loop termination condition, the loop having a beginning and an end;

(c) scanning the loop to find assignments to a set of N variables $S_i$ within the loop which are of the form:

$$S_i = \Sigma C_{ij} S_j + d_i;$$

(d) constructing in computer memory a transfer matrix A and a vector b relating the values of the variables $S_i$ at the end of loop to the values of the variables $S_i$ at the beginning of the loop, the matrix A having a size which is N×N wherein:

$$S_i(\text{end}) = \Sigma A_{ij} S_j(\text{beginning}) + a_i;$$

(e) initializing a working transfer matrix $A_0$ to A;

(f) initializing p to 0 and m to N;

(g) initializing a matrix $U_0$ having an inverse matrix $U_0^{-1}$ to an identity matrix;

(h) selecting an eigenvalue λ from an eigenvalue list stored in computer memory;

(i) finding a number e of eigenvectors corresponding to the eigenvalue λ in an m×m submatrix of the matrix $A_p$, if no eigenvectors are found then continue with step (k);

(j) decrementing m by e, transforming $A_p$ to $A_{p+1}$ to form a new transfer matrix $A_{p+1}$, transforming $U_p$ to form a new unimodular matrix $U_{p+1}$, transforming $U_p^{-1}$ to a new inverse unimodular matrix $U_{p+1}^{-1}$, and incrementing p by one and then repeating step (i);

(k) repeating steps (h) through (k) until all eigenvalues λ in the eigenvalue list stored in computer memory have been selected in step (h);

(l) multiplying the vector a by the $U_p^{-1}$ to form a vector $a_p$;

(m) analyzing the matrix $A_p$ and the vector $a_p$ to find N-m transformed induction variables and m transformed non-induction variables; and (n) transforming the N-m transformed induction variables and m transformed non-induction variables using the matrix $U_p$ to determine induction properties of the variables $S_i$.

12. The method of claim 11 wherein the step (h) comprises:

using the eigenvalue list wherein the eigenvalue list comprises an eigenvalue selected from the group consisting of: 1, −1, 2, and 0.

13. The method of claim 11 further comprising the step of:

using the induction properties of the variables $S_i$ to optimize an execution of the loop in terms of speed of execution.

14. The method of claim 11 wherein the step (m) further comprising the steps of:

(a) providing the matrix $A_p$ having a diagonal and an integer vector $a_p$ in computer memory, the matrix $A_p$ being an integer matrix having a size of N×N, an upper left m×m submatrix in the matrix $A_p$ containing integer values, the last N-m rows of the matrix $A_p$ having zero values to the left of the diagonal of the matrix $A_p$;

(b) providing a set of variables $y_i^{(t)}$ in computer memory such that:

$$y_i^{(t+1)} = \Sigma A_{ij} y_j^{(t)} + a_i$$

wherein t is a iteration counter for the loop, i represents rows in a matrix and j represents column in a matrix;

(c) initializing p to N;

(d) selecting a method for finding induction variables depending upon the value of $A_{pp}$ which is a diagonal value in the matrix A;

(e) using the method and zero or more previously determined induction variables to determine $y_p^{(i)}$ as a linear combination of a set of predetermined functions of t;

(f) decrementing p by one;

(g) performing steps (d) through (g) while p>m; and (h) assigning for any p≦m an independent undetermined function of t to $y_p^{(i)}$.

15. The method of claim 11 wherein the step (d) comprises:

forming the transfer matrix A as an integer matrix having N×N integer entries.

16. A data processing system for finding induction variables, the data processing system comprising:

means for accessing a plurality of program instructions wherein the plurality of program instructions contain a looping structure wherein the looping structure contains program instructions which are executed more than once in a looping manner, the means for accessing creating an analyzable representation of the looping structure;

means for scanning accessing the analyzable representation of the looping structure to find N variables assignment statements in the looping structure wherein the N variable assignment statements assigns a value to at least one variable $S_i(1<i≦N)$, the variable assignment statements being of the form:

$$S_i = \Sigma C_{ij} S_j + d_i$$

wherein $\Sigma C_{ij} S_j$ represents at least one term of the form constant.variable and $d_i$ represents a constant having a value $-\infty < d_i < \infty$; and means for analyzing the variables $S_i$ wherein the means for analyzing represents the variables $S_i$ in a transfer matrix A which is N×N in size, the means for analyzing iteratively transforming the matrix A via multiplication by an integer unimodular matrix U until induction information from the variables $S_i$ is attained.

17. The data processing system of claim 16 wherein the means for analyzing iteratively transforms that matrix A by performing matrix multiplication transform operations of the form $U^{-1} \cdot A \cdot U$ wherein $U^{-1}$ is an inverse matrix of the matrix U.

18. The data processing system of claim 16 wherein the means for analyzing iteratively transforms that matrix A to a new matrix A' wherein the new matrix A' has diagonal elements which are integer eigenvalues.

19. A data processing system for finding induction variables, the data processing system comprising:

means for accessing a plurality of program instructions wherein the plurality of program instructions contain a looping structure, the means for accessing creating an analyzable representation of the looping structure;

means for scanning accessing the analyzable representation of the looping structure to find N variables assignment statements in the looping structure wherein the N variable assignment statements assigns a value to at least one variable $S_i(1<i≦N)$; and means for analyzing the variables $S_i$ wherein the means for analyzing represents the variables $S_i$ in a transfer matrix A which is N×N in size, the means for analyzing iteratively transforming the matrix A via multiplication by an integer unimodular matrix U until induction information from the variables $S_i$ is attained.

20. A method for transforming a first matrix A to a second matrix A' to expose an eigenvalue, the method comprising the steps of:

providing the first matrix A having a diagonal stored on a computer memory and accessible by a central processing unit (CPU), the first matrix A being an integer matrix having a size of N×N, an m×m submatrix in the first matrix A containing integer values where m≦N, the last N-m rows of the first matrix A having zero values to the left of the diagonal of the first matrix A, the matrix A being stored in computer memory;

transforming the first matrix A to the second matrix A' in the computer memory by executing computer instructions via the CPU wherein the second matrix A' is an integer matrix having a size of N×N, an upper left m'×m' submatrix in the second matrix A' containing integer values wherein m'<m, the last N-m rows of the matrix A' being the same as the last N-m rows of the matrix A, the rows m'+1 to m of the second matrix A' having zero values to the left of the diagonal of the second matrix A' wherein a diagonal element in each of these m'−m rows contains the eigenvalue; and using the eigenvalue to compile computer code located in computer memory, wherein the computer code is compiled into an executable form which is then manufactured onto computer-readable medium.

21. The method of claim 20 further comprising:

using the matrix A' from the step of transforming as a new matrix A and performing the step of transforming iteratively in order to continually transform the matrix A to an increasingly transformed matrix A' until the increasingly transformed matrix A' is used to determine induction properties of variables represented by the increasingly transformed matrix A'.

22. The method of claim 21 wherein the step of transforming comprises:

transforming the matrix A to the matrix A' by performing the matrix operation $U^{-1} \cdot A \cdot U$ wherein U is an integer unimodular matrix having an inverse matrix $U^{-1}$.

23. A method for transforming a first matrix A to a second matrix A' to expose an eigenvalue, the method comprising the steps of:

providing the first matrix A having a diagonal stored on a computer memory and accessible by a central processing unit (CPU), the first matrix A being an integer matrix having a size of N×N, an m×m submatrix in the first matrix A containing integer values wherein m≦N, the last N-m columns of the first matrix A having zero values to the right of the diagonal of the first matrix A, the matrix A being stored in computer memory;

transforming the first matrix A to the second matrix A' in the computer memory by executing computer instructions via the CPU wherein the second matrix A' is an integer matrix having a size of N×N, an upper left m'×m' submatrix in the second matrix A' containing integer values wherein m'<m, the last N-m columns of the matrix A' being the same as the last N-m columns of the matrix A, the columns m'+1 to m of the second matrix A' having zero values to the right of the diagonal of the second matrix A' wherein the diagonal in each of these m'−m columns contains the eigenvalue; and using the eigenvalue to compile computer code located in computer memory, wherein the computer code is compiled into an executable form which is then manufactured onto computer-readable medium.

24. The method of claim 23 further comprising:

using the matrix A' from the step of transforming as a new matrix A and performing the step of transforming iteratively in order to continually transform the matrix A to an increasingly transformed matrix A' until the increasingly transformed matrix A' is used to determine induction properties of variables represented by the increasingly transformed matrix A'.

25. The method of claim 21 wherein the step of transforming comprises:

transforming the matrix A to the matrix A' by performing the matrix operation $U^{-1} \cdot A \cdot U$ wherein U is an integer unimodular matrix having an inverse matrix $U^{-1}$.

26. A method for solving an induction variable problem associated with a matrix A, the method comprising the steps of:

(a) providing the matrix A and an integer vector a in computer memory, the matrix A being an integer matrix having a size of N×N, an upper left m×m submatrix in the matrix A containing integer values, the last N-m rows of the matrix A having zero values to the left of the diagonal of the matrix A, the matrix A;

(b) providing a set of variables $y_i^{(t)}$ in computer memory such that:

$$y_i^{(t+1)} = \Sigma A_{ij} y_j^{(t)} + ai;$$

where t is a loop iteration count value;

(c) initializing p to N;

(d) selecting a method for finding induction variables depending upon the value of $A_{pp}$ which is a diagonal value in the matrix A;

(e) using the method and zero or more previously determined induction variables to determine $y_p^{(t)}$ as a linear combination of a set of predetermined functions of t;

(f) decrementing p by one;

(g) performing steps (d) through (g) while p>m;

(h) assigning for any p≦m an independent undetermined function of t to $y_p^{(t)}$; and (i) using the steps (a) through (h) to compile computer code to executable code and storing the executable code onto computer readable medium.

27. A method for solving an induction variable problem associated with a matrix A, the method comprising the steps of:

(a) providing the matrix A and an integer vector a in computer memory, the matrix A being an integer matrix having a size of N×N, an upper left m×m submatrix in the matrix A containing integer values, the last N-m columns of the matrix A having zero values to the left of the diagonal of the matrix A, the matrix A;

(b) providing a set of variables $y_i^{(t)}$ in computer memory such that:

$$y_i^{(t+1)} = \Sigma A_{ij} y_j^{(t)} + ai;$$

where t is a loop iteration count value;

(c) initializing p to N;

(d) selecting a method for finding induction variables depending upon the value of $A_{pp}$ which is a diagonal value in the matrix A;

(e) using the method and zero or more previously determined induction variables to determine $y_p^{(t)}$ as a linear combination of a set of predetermined functions of t;

(f) decrementing p by one;

(g) performing steps (d) through (g) while p>m;

(h) assigning for any p≦m an independent undetermined function of t to $y_p^{(t)}$; and (i) using the steps (a) through (h) to compile computer code to executable code and storing the executable code onto computer readable medium.

28. A method for determining induction variables comprising the steps of:

accessing a file stored in computer memory, the file containing several program statements wherein a plurality of the program statements are to be executed in a looping execution flow;

parsing the file to produce a representation of the program statements contained in the file;

identifying, from the representation, the plurality of program statements which is to be executed in a looping execution flow;

identifying a set of potential induction variables within the plurality of the program statements within the looping execution flow;

reducing the set of potential induction variables to a reduced set of potential induction variables wherein the number of potential induction variables in the reduced set is ≦ the number of potential induction variables in the set of potential induction variables;

creating a transfer matrix A in computer memory which represents the relationships of the values of the potential induction variables in the reduced set of potential induction variables at the end of an execution of the loop to the values of the potential induction variables in the reduced set of potential induction variables at the start of that execution;

transforming the transfer matrix A to a transformed matrix A' wherein the transformed matrix A' is easier to analyze for induction variables than the transfer matrix A, the transforming being performed by using a unimodular integer transformation;

analyzing the matrix A' to find transformed induction variables and transformed non-induction variables wherein the value of a transformed induction variable at the beginning of the Nth execution of the loop is a linear combination of a predetermined set of functions of N; and applying the inverse of the unimodular transformation to the transformed induction variables and transformed non-induction variables thereby expressing a plurality of the variables in the reduced set of potential induction variables as a linear combination of the predetermined functions of N.

29. A method for processing induction variables, the method comprising the steps of:

(a) providing a user source code in computer memory;

(b) parsing the user source code via means for parsing which is stored in computer memory to find a loop in the user source code, the loop being a portion of the user source code which selectively executes several times in sequence, the loop having a beginning and an end;

(c) scanning the loop to find assignments to a set of N variables $S_i$ within the loop;

(d) constructing in computer memory a transfer matrix A and a vector a relating the values of the variables $S_i$ at the end of loop to the values of the variables $S_i$ at the beginning of the loop, the matrix A having a size which is N×N;

(e) initializing a working transfer matrix $A_0$ to A;

(f) initializing m to N and p to zero;

(g) initializing a matrix $U_0$ having an inverse matrix $U_0^{-1}$ to a predetermined configuration;

(h) selecting an eigenvalue $\lambda$ from an eigenvalue list which is stored in computer memory;

(i) finding a number e of eigenvectors corresponding to the eigenvalue $\lambda$ in an m×m submatrix of the matrix $A_p$, if no eigenvectors are found then continue with step (k);

(j) decrementing m by e, transforming $A_p$ to $A_{p+1}$ to form a new transfer matrix $A_{p+1}$, transforming $U_p$ to form a new unimodular matrix $U_{p+1}$, transforming $U_p^{-1}$ to a new inverse unimodular matrix $U_{p+1}^{-1}$, and incrementing p by one and then repeating step (i);

(k) repeating steps (h) through (k) until all eigenvalues $\lambda$ in the eigenvalue list stored in computer memory have been selected in step (h);

(l) multiplying the vector a by the $U_p^{-1}$ to form a vector $a_p$;

(m) analyzing the matrix $A_p$ and the vector $a_p$ to find N-m transformed induction variables and m transformed non-induction variables;

(n) transforming the N-m transformed induction variables and m transformed non-induction variables using the matrix $U_p$ to determine induction properties of the variables $S_i$; and (o) using the induction properties to compile the user source code into executable code stored in computer memory and mass manufacturing a plurality of computer readable means containing the executable code.

30. A data processing system comprising:

a central processing unit for executing instructions; and a computer memory, coupled to the central processing unit, which stores an induction variable identifier and a plurality of program instructions, the induction variable identifier accessing the plurality of program instructions to find at least one instruction in the plurality of instructions which is executed in a loop, the induction variable identifier scanning the loop to identify potential induction variables within the loop and representing the potential induction variables in a transfer matrix A, the transfer matrix A being iteratively mapped via at least one matrix multiplication step wherein the transfer matrix A is multiplied with a unimodular matrix U to form a transformed matrix A', the induction variable identifier determining induction variable properties for the potential induction variables within the loop from the transformed matrix A'.

31. A method for determining induction variables within a plurality of computer instructions, the method comprising the steps of:

accessing computer code from computer memory;

identifying the plurality of computer instructions in the computer code, the plurality of instructions being executed in a loop and containing at least one assignment statement which assigns a numerical value to at least one variable within the loop;

representing the at least one assignment statement in a transfer matrix format in computer memory wherein the values of the at least one variables at the end of an execution of the loop are expressed in terms of the values of the at least one variables at the beginning of the execution of the loop;

performing multiplication operations on the transfer matrix by multiplying the transfer matrix with an integer unimodular matrix stored in computer memory to determine if the at least one assignment statement includes any induction variables; and analyzing the induction variables to allow for compilation of the computer code to executable code which can be executed by a data processing system comprising a central processing unit (CPU).

32. The method of claim 31 wherein the step of representing the at least one assignment statement in a transfer matrix format comprises:

making all of the entries in the transfer matrix format integer values.

33. A method for determining induction variables within a plurality of computer instructions, the method comprising the steps of:

accessing computer code from computer memory;

identifying the plurality of computer instructions in the computer code, the plurality of instructions being executed in a loop and containing at least one assignment statement which assigns a numerical value to at least one variable within the loop;

representing the at least one assignment statement in a matrix format in computer memory and analyzing the matrix by performing eigenvalue analysis on linear combinations of the at least one variable to determine if any linear combination of the at least one variable are induction variables; and analyzing the any linear combination of the at least one variable are induction variables to compile the computer code to executable code which can be executed by a data processing system comprising a central processing unit (CPU).

34. A method for determining induction variables within a plurality of computer instructions, the method comprising the steps of:

accessing computer code from computer memory;

identifying the plurality of computer instructions in the computer code, the plurality of instructions being executed in a loop and containing at least one assignment statement which assigns a numerical value to at least one variable within the loop;

accessing a plurality of eigenvalues stored by a user in computer memory wherein the eigenvalues in the plurality of eigenvalues are a plurality of values which are within the range of $-\infty$ and $+\infty$;

representing the at least one assignment statement in a matrix format in computer memory and analyzing the matrix by performing eigenvalue analysis on linear combinations of the at least one variable by using the plurality of eigenvalues to determine induction variable properties from the at least one variable; and analyzing the induction variable properties to compile the computer code to executable code which can be executed by a data processing system comprising a central processing unit (CPU).

35. An induction variable identifier stored via computer-readable memory media wherein the computer-readable memory media comprises:

a plurality of binary values for accessing computer code from a memory area;

a plurality of binary values for scanning the computer code to find a looping instruction structure containing loop instructions, the looping instructions containing at least one assignment statement which assign at least one value to at least one variable;

a plurality of binary values for representing the at least one assignment statement in the looping instructions in a transfer matrix format in the memory area wherein the at least one value of the at least one variable at the end of an execution of the loop are expressed in terms of the at least one value of the at least one variable at the beginning of the execution of the loop; and a plurality of binary values for performing multiplication operations by multiplying the transfer matrix with an integer unimodular matrix to determine if the at least one assignment statement includes any induction variables.

* * * * *